United States Patent
Phillips et al.

(10) Patent No.: US 10,142,259 B2
(45) Date of Patent: Nov. 27, 2018

(54) CONFLICT DETECTION AND RESOLUTION IN AN ABR NETWORK

(71) Applicant: ERICSSON AB, Stockholm (SE)

(72) Inventors: Chris Phillips, Hartwell, GA (US); Jennifer Ann Reynolds, Duluth, GA (US); Charles Hammett Dasher, Lawrenceville, GA (US); Michael Huber, Täby (SE)

(73) Assignee: ERICSSON AB, Stockholm (SE)

( * ) Notice: Subject to any disclaimer, the term of this patent is extended or adjusted under 35 U.S.C. 154(b) by 548 days.

(21) Appl. No.: 14/194,868

(22) Filed: Mar. 3, 2014

(65) Prior Publication Data

US 2015/0249622 A1    Sep. 3, 2015

(51) Int. Cl.
G06F 15/16 (2006.01)
H04L 12/911 (2013.01)
H04L 29/06 (2006.01)

(52) U.S. Cl.
CPC ............ *H04L 47/823* (2013.01); *H04L 47/74* (2013.01); *H04L 47/748* (2013.01); *H04L 65/4084* (2013.01); *H04L 65/4092* (2013.01); *H04L 65/60* (2013.01)

(58) Field of Classification Search
CPC .................................................. H04L 47/823
USPC ......................................................... 709/219
See application file for complete search history.

(56) References Cited

U.S. PATENT DOCUMENTS

| | | | |
|---|---|---|---|
| 5,737,313 A | 4/1998 | Kolarov | |
| 5,841,777 A | 11/1998 | Cohen | |
| 5,982,748 A | 11/1999 | Yin | |
| 6,014,694 A | 1/2000 | Aharoni | |
| 6,134,515 A | 10/2000 | Skogby | |
| 6,396,531 B1 | 5/2002 | Gerszberg | |

(Continued)

FOREIGN PATENT DOCUMENTS

| | | |
|---|---|---|
| EP | 2323314 A1 | 5/2011 |
| GB | 2456026 A | 7/2009 |
| WO | WO 2009/112720 A1 | 9/2009 |

OTHER PUBLICATIONS

Welzl, "Composing QoS from congestion control elements", 2005.
(Continued)

*Primary Examiner* — Jason Recek
*Assistant Examiner* — Clarence D McCray

(57) ABSTRACT

A scheme for managing conflict resolution in an ABR streaming environment with respect to a bandwidth pipe serving a customer premises. In one aspect, when a session request is received from a new ABR client launched in the customer premises that includes one or more existing ABR clients having corresponding streaming sessions, a bandwidth forecasting module is configured to forecast bandwidth requirements with respect to the corresponding ABR streaming sessions after accounting for a bandwidth requirement for the new ABR client's session request. A conflict may be detected if any of forecasted bandwidth requirements violates a bitrate threshold policy relative to the corresponding ABR streaming sessions and/or the new session being requested. If there is a conflict, a conflict notification message to the new ABR client is provided and the session request from the new ABR client is rejected.

16 Claims, 13 Drawing Sheets

(56) References Cited

U.S. PATENT DOCUMENTS

| | | | |
|---|---|---|---|
| 6,519,595 B1* | 2/2003 | Rose | H04L 12/5695 370/398 |
| 6,536,043 B1 | 3/2003 | Guedalia | |
| 6,564,262 B1 | 5/2003 | Chaddha | |
| 6,687,228 B1* | 2/2004 | Fichou | H04L 12/5601 370/232 |
| 6,754,223 B1 | 6/2004 | Lussier | |
| 6,931,059 B1 | 8/2005 | Van Dusen | |
| 7,558,869 B2 | 7/2009 | Leon | |
| 8,219,670 B2 | 7/2012 | Agrawala | |
| 8,483,735 B2 | 7/2013 | Manssour | |
| 2001/0038639 A1* | 11/2001 | McKinnon, III | H04L 12/2801 370/468 |
| 2002/0116518 A1 | 8/2002 | Silen | |
| 2003/0185203 A1 | 10/2003 | Chow | |
| 2003/0204602 A1 | 10/2003 | Hudson | |
| 2004/0031054 A1 | 2/2004 | Dankworth | |
| 2004/0111613 A1 | 6/2004 | Shen-Orr | |
| 2004/0125877 A1 | 7/2004 | Chang | |
| 2004/0203854 A1 | 10/2004 | Nowak | |
| 2005/0213586 A1* | 9/2005 | Cyganski | H04L 41/0896 370/395.41 |
| 2005/0228892 A1* | 10/2005 | Riley | H04L 47/724 709/228 |
| 2006/0136597 A1 | 6/2006 | Shabtai | |
| 2007/0024705 A1 | 2/2007 | Richter | |
| 2007/0070890 A1* | 3/2007 | Rojahn | H04L 41/0896 370/229 |
| 2009/0019178 A1* | 1/2009 | Melnyk | H04L 47/10 709/233 |
| 2009/0031354 A1 | 1/2009 | Riley | |
| 2009/0031384 A1 | 1/2009 | Brooks | |
| 2009/0100459 A1 | 4/2009 | Riedl | |
| 2009/0172167 A1* | 7/2009 | Drai | H04L 45/125 709/226 |
| 2010/0260048 A1* | 10/2010 | Dolganow | H04L 43/028 370/235 |
| 2011/0161485 A1* | 6/2011 | George | H04L 65/80 709/224 |
| 2011/0268428 A1 | 11/2011 | Chen | |
| 2011/0276394 A1 | 11/2011 | Chan | |
| 2011/0314130 A1 | 12/2011 | Strasman | |
| 2012/0005705 A1 | 1/2012 | Youssefmir | |
| 2012/0017282 A1* | 1/2012 | Kang | G06F 21/10 726/26 |
| 2012/0023251 A1 | 1/2012 | Pyle | |
| 2012/0047230 A1 | 2/2012 | Begen | |
| 2012/0054344 A1 | 3/2012 | Udani | |
| 2012/0170915 A1 | 7/2012 | Braness | |
| 2012/0263434 A1 | 10/2012 | Wainner | |
| 2012/0265856 A1 | 10/2012 | Major | |
| 2012/0300834 A1* | 11/2012 | Metoevi | H04N 19/139 375/240.02 |
| 2012/0311686 A1* | 12/2012 | Medina | H04L 63/0807 726/7 |
| 2012/0314718 A1 | 12/2012 | Strasman | |
| 2013/0007201 A1 | 1/2013 | Jeffrey | |
| 2013/0007831 A1 | 1/2013 | Wu | |
| 2013/0013764 A1 | 1/2013 | Li | |
| 2013/0054972 A1 | 2/2013 | Thorwirth | |
| 2013/0067052 A1 | 3/2013 | Reynolds | |
| 2013/0097309 A1* | 4/2013 | Ma | H04L 29/08099 709/224 |
| 2013/0179590 A1 | 7/2013 | McCarthy | |
| 2013/0191508 A1 | 7/2013 | Strasman | |
| 2013/0227053 A1 | 8/2013 | Bouazizi | |
| 2013/0297743 A1 | 11/2013 | Eschet | |
| 2013/0332623 A1* | 12/2013 | Gahm | H04L 65/4092 709/234 |
| 2014/0006951 A1 | 1/2014 | Hunter | |
| 2014/0181266 A1* | 6/2014 | Joch | H04L 65/605 709/219 |
| 2014/0219088 A1 | 8/2014 | Oyman | |
| 2014/0229604 A1 | 8/2014 | Pfeffer | |
| 2014/0269314 A1* | 9/2014 | Ozer | H04L 47/25 370/235 |
| 2014/0351385 A1* | 11/2014 | Li | H04L 65/601 709/219 |
| 2015/0121407 A1* | 4/2015 | Ruffini | H04N 21/2662 725/14 |
| 2015/0256906 A1 | 9/2015 | Jones | |

OTHER PUBLICATIONS

Paya et al., "A Cloud Service for Adaptive Digital Music Streaming", 2012.
Praveen et al., "Analysis on Various Techniques in Cloud Based Mobile Video Streaming", 2014.
Smith et al., "Available Bit Rate—a new service for ATM", 1996.
Hegde et al., "Real-Time Adaptive Bandwidth Allocation for ATM Switches", 1999.
Atieh et al., "Buffer Requirements for ABR Traffic Using Congestion Control Mechanism", 1999.
Ritter, "Analysis of a Rate-Based Control Policy with Delayed Feedback and Variable Bandwidth Availability", 1996.
Dunn et al., "Terminology for ATM ABR Benchmarking", RFC 3134, 2001.
Liu et al., "Rate Adaptation for Adaptive HTTP Streaming", 2011
Cheng et al., "Java-Based Bandwidth Measurement Tool for xDSL Networks", 2002.
Boll et al., "MPEG-UMRP: Implementing Adaptive Streaming of MPEG Videos for Interactive Internet Applications", 2001.
RealEyes Media, "HTTP Dynamic Streaming—Part 1: An Introduction to Streaming Media", 2011.
Desai, "An Adaptive QoS Mechanism for Multimedia Applications in Heterogeneous Environments", 2001.
Oyman et al., "Quality of Experience for HTTP Adaptive Streaming Services", 2012.
Martin et al., "III: An Adaptive Infrastructure for Dynamic Interactive Distributed Applications", 1998.

* cited by examiner

CONFLICT DETECTION AND RESOLUTION IN AN ABR NETWORK

REFERENCE TO RELATED APPLICATION(S)

This application discloses subject matter that is related to the subject matter of the following U.S. patent application(s): (i) "BANDWIDTH MANAGEMENT FOR OVER-THE-TOP ADAPTIVE STREAMING", application Ser. No. 13/845,320 filed Mar. 18, 2013, in the name(s) of Christopher Phillips et al., (ii) "REGULATING CONTENT STREAMS FROM A WEIGHTED FAIR QUEUING SCHEDULER USING WEIGHTS DEFINED FOR USER EQUIPMENT NODES", application Ser. No. 13/597,333 filed Aug. 29, 2012, in the name(s) of Christopher Phillips et al., (iii) "METHODS AND APPARATUS FOR MANAGING NETWORK RESOURCES USED BY MULTIMEDIA STREAMS IN A VIRTUAL PIPE", application Ser. No. 13/403,075 filed Feb. 23, 2012, in the name(s) of Christopher Phillips et al., and (iv) "METHODS, APPARATUS, AND COMPUTER PROGRAM PRODUCTS FOR ALLOCATING BANDWIDTH FOR PUSH AND PULL CONTENT REQUESTS IN A CONTENT DELIVERY NETWORK", application Ser. No. 13/856,895, filed Apr. 4, 2013, in the name(s) of Christopher Phillips et al., each of which is hereby incorporated by reference in its entirety. The subject matter of the present patent application is also related to the subject matter of the following U.S. patent application(s) filed even date herewith: (i) "CONFLICT DETECTION AND RESOLUTION IN AN ABR NETWORK USING CLIENT INTERACTIVITY", application Ser. No. 14/194,918, in the name(s) of Christopher Phillips et al., which is hereby incorporated by reference in its entirety.

FIELD OF THE DISCLOSURE

The present disclosure generally relates to communication networks. More particularly, and not by way of any limitation, the present disclosure is directed to a scheme for effectuating conflict detection and resolution in an adaptive bitrate (ABR) streaming environment.

BACKGROUND

A content delivery network or CDN (sometimes also referred to as a content distribution network) typically distributes content in a "best effort" fashion across the nodes throughout a network using technologies such as ABR streaming. It is known, however, that ABR can result in unfair and sometimes incongruous apportionment of bandwidth on a network based upon the order multiple clients begin to use a network resource. Since the bandwidth usage is typically determined by a client requesting the content, and because ABR clients can be opportunistic, they may become greedy, thereby affecting the overall bandwidth quality of a bandwidth pipe. Although current ABR systems allow bandwidth to be "adapted" to existing network conditions, such solutions continue to be deficient relative to more realistic content consumption environments.

SUMMARY

The present patent disclosure is broadly directed to systems, methods, apparatuses, devices, and associated non-transitory computer-readable media for managing conflict resolution in an ABR streaming environment with respect to a bandwidth pipe serving a customer premises. In one embodiment, a method is disclosed that comprises, inter alia, the following features: receiving a session request from a new ABR client launched in the customer premises that includes one or more existing ABR clients, wherein each existing ABR client is engaged in a corresponding ABR streaming session; forecasting bandwidth requirements for the one or more existing ABR clients with respect to the corresponding ABR streaming sessions after accounting for a bandwidth requirement for the new ABR client's session request; detecting or otherwise determining a conflict condition (e.g., an impending conflict) if any of forecasted bandwidth requirements violates a bitrate threshold policy relative to the corresponding ABR streaming sessions of the existing ABR clients; and if there is a conflict, providing a conflict notification message (e.g., a video-encoded still image of a suitable message) to the new ABR client and rejecting the session request from the new ABR client.

In another aspect, an embodiment of a system for managing conflict resolution in an ABR streaming environment is disclosed. The claimed embodiment comprises, inter alia, a back office operative to receive a session request from a new ABR client launched by a client device in the customer premises that includes one or more existing ABR clients, wherein each existing ABR client is engaged in a corresponding ABR streaming session. A subscriber policy management node is provided that is operative to request, responsive to a message from the back office, one of a premises gateway and a CDN edge delivery node for forecasted bandwidth requirements of the one or more existing ABR clients with respect to the corresponding ABR streaming sessions after accounting for a bandwidth requirement for the new ABR client's session request. The subscriber policy management node is further operative to detect or otherwise determine a conflict condition (potential or otherwise) if any of forecasted bandwidth requirements violates a bitrate threshold policy relative to the corresponding ABR streaming sessions of the existing ABR clients. A conflict management node is operative, responsive to a conflict detection or determination message from the subscriber policy management node, to generate a conflict message encoding request to a video message system for facilitating transmission of a still image of a conflict notification message to the new ABR client that the session request from the new ABR client is being rejected on account of a bandwidth conflict.

In another aspect, an embodiment of a premises gateway configured to manage a bandwidth pipe serving a customer premises is disclosed. The claimed embodiment comprises, inter alia, one or more processors; and a bitrate forecasting module coupled to the one or more processors, wherein the bitrate forecasting module includes instructions executable by one or more processors and configured to perform or otherwise effectuate the following in conjunction with the processor(s): forecast bandwidth requirements, responsive to a request from a subscriber policy management node, for one or more existing ABR clients of a customer premises with respect to corresponding ABR streaming sessions after accounting for a bandwidth requirement of a new ABR client's request for initiating a new streaming session on a client device; and generate a bandwidth forecast response message to the subscriber policy management node, the bandwidth forecast response message including bitrates forecasted for the existing ABR streaming sessions and/or the requested new streaming session based at least in part upon priority weights associated with the existing ABR streaming sessions and the requested new streaming session.

Similarly, in a related aspect, an embodiment of an edge delivery node is disclosed that includes a bitrate forecasting module configured to facilitate the functionalities set forth hereinabove, mutatis mutandis.

In a still further aspect, another embodiment of a method for managing conflict resolution is disclosed. The claimed embodiment comprises, inter alia, the following features: receiving a session request from a new ABR client launched in the customer premises that includes one or more existing ABR clients, wherein each existing ABR client is engaged in a corresponding ABR streaming session; forecasting bandwidth requirements for the one or more existing ABR clients with respect to the corresponding ABR streaming sessions after accounting for a bandwidth requirement for the new ABR client's session request; detecting or otherwise determining a conflict condition if any of forecasted bandwidth requirements violates a bitrate threshold policy relative to the corresponding ABR streaming sessions of the existing ABR clients; launching an interactive session with at least one of the new ABR client and an existing ABR client with respect to the session request; presenting a dialog to a user of the at least one of the new ABR client and an existing ABR client, the dialog for offering one or more options to the user relative to the session request; and accepting an option input by the user and effectuating an action responsive to the option.

In a related embodiment, a system for managing conflict resolution with respect to a new ABR client is disclosed, comprising, inter alia, a conflict management node that is operative, responsive to a conflict detection message from a subscriber policy management node, to perform or effectuate the following features: facilitate launching of an interactive session with at least one of the new ABR client and an existing ABR client with respect to the new ABR client's session request; present a dialog to a user of the at least one of the new ABR client and an existing ABR client, the dialog for offering one or more options to the user relative to the session request; and accept an option input by the user and effectuate an action responsive to the option. Additionally, the subscriber policy management node of the claimed embodiment is operative responsive to a back office message (e.g., a policy request message relative to the new ABR client's session request), similar to one or more embodiments described above, mutatis mutandis.

In still further aspects, one or more embodiments of a non-transitory computer-readable medium containing computer-executable program instructions or code portions stored thereon are disclosed for performing one or more embodiments of the methods set forth above when executed by a processor of a network node, element, gateway, and the like.

Advantages of the present invention include, but not limited to, providing greater transparency and control to end users with respect to the consumption of ABR assets in a streaming environment having potential conflicts. The embodiments may allow users to override standing policies and control how conflicts in policies are notified and resolved. In legacy client applications, at least some embodiments allow the inventive features of the present application to be implemented regardless of existing technology, thereby facilitating fairly inexpensive and more universal rollout of the inventive technology. With respect to custom client applications, the inventive features allow user interactivity, providing a more robust and customer-focused experience in resolving bandwidth conflicts. Further features of the various embodiments are as claimed in the dependent claims. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1A:
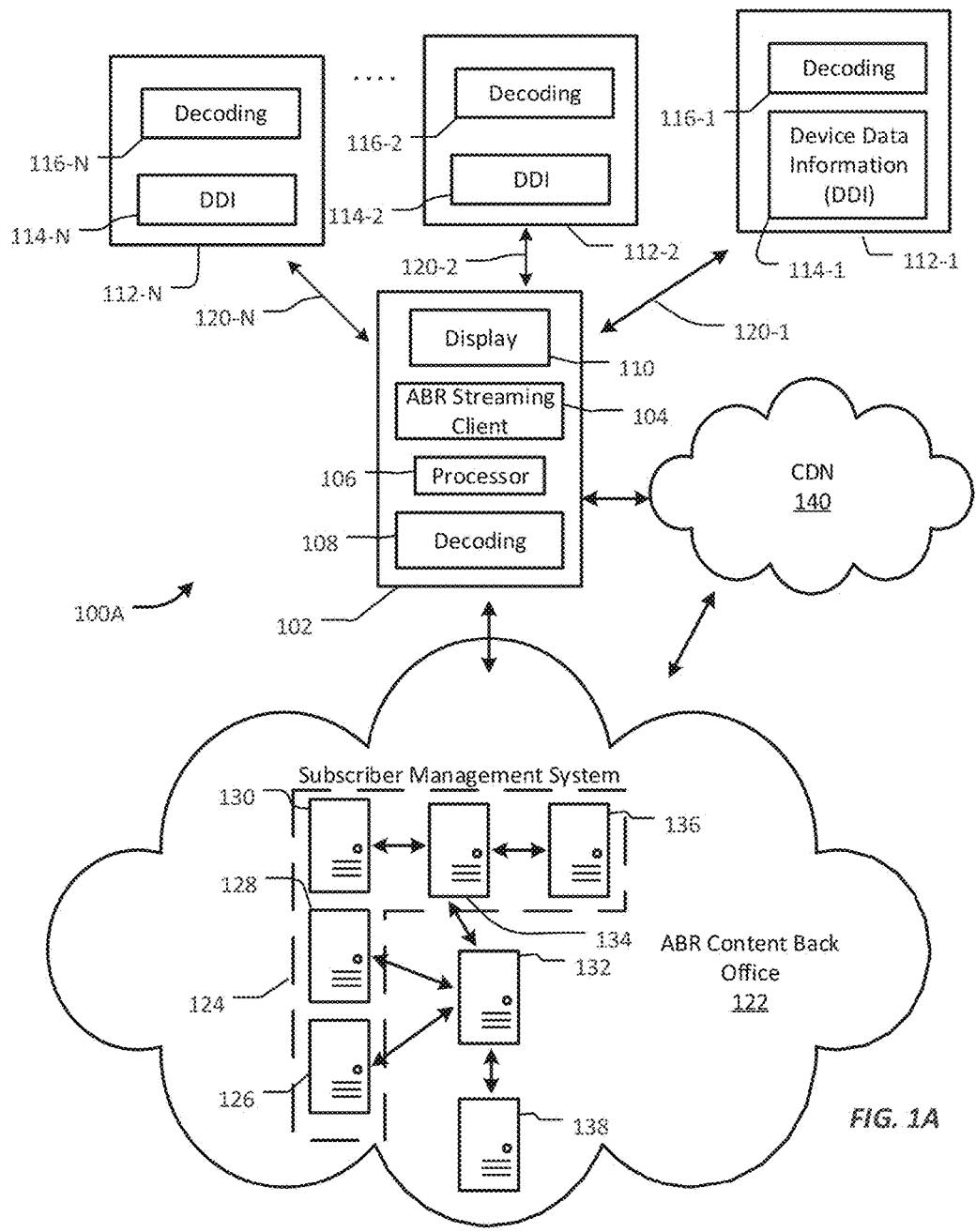
FIG. 1A depicts an example ABR streaming network arrangement including a content delivery network (CDN) and an ABR network back office environment wherein one or more embodiments of the present patent application may be practiced.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. Some network elements may comprise "multiple services network elements" that provide support for multiple network-based functions (e.g., A/V media management, session control, Quality of Service (QoS) policy enforcement, bandwidth scheduling management, subscriber/device policy and profile management, content provider priority policy management, streaming policy management, conflict management, and the like), in addition to providing support for multiple application services (e.g., data and multimedia applications). Subscriber end stations or client devices may comprise any device configured to execute, inter alia, a streaming client application (e.g., an ABR streaming client application) for receiving content from one or more content providers. Accordingly, such client devices may include set-top boxes, PVR/DVRs, workstations, laptops, netbooks, palm tops, mobile phones, smartphones, multimedia phones, Voice Over Internet Protocol (VOIP) phones, mobile/wireless user equipment, high definition TV terminals, portable media players, gaming systems or consoles (such as the Wii®, Play Station 3®, Xbox 360®), etc., that may access or consume content/services provided over a content delivery network for purposes of one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1A, depicted therein is an example ABR streaming network environment 100A including a content delivery network or content distribution network (CDN) 140 and a streaming network back office infrastructure 122 wherein one or more embodiments of the present patent application may be practiced. For purposes of the present patent application, CDN 140 may comprise an overlay network architected for high-performance streaming of a variety of digital assets or program assets as well as services (hereinafter referred to as "content") to subscribers using one or more Internet-based infrastructures, private/dedicated infrastructures or a combination thereof. In general, the terms "content" or "content file" as used in reference to at least some embodiments of the present patent disclosure may include digital assets and program assets such as any type of audio/video content or program segment, streaming or static (e.g., recorded over-the-air free network television (TV) shows or programs, pay TV broadcast programs via cable networks or satellite networks, free-to-air satellite TV shows, IPTV programs, etc.), Over-The-Top (OTT) and video-on-demand (VOD) or movie-on-demand (MOD)

shows or programs, time-shifted TV (TSTV) content, as well as other content assets provided by content publishers, owners or providers, including but not limited to software files, executable computer code or programs, online electronic games, Internet radio shows/programs, entertainment programs, educational programs, movies, music video programs, and the like, that may be delivered using any known or heretofore unknown streaming technologies. By way of illustration, content delivered via CDN 140 using ABR streaming techniques may be encoded to support Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on. In general, the overlay architecture of CDN 140 may include a multi-level, hierarchically-organized interconnected assembly of network servers for providing media pathways or "pipes" from one or more central distribution nodes to one or more levels of regional distribution nodes that are connected to one or more local edge servers configured to serve a plurality of end users or subscribers in respective serving location areas. In addition to such "distribution servers" (sometimes also referred to as "surrogates"), CDN 140 may also include and/or interoperate with various network elements configured to effectuate request redirection or rerouting mechanisms as well as related back office systems or nodes such as operator/subscriber policy management systems, bandwidth scheduling systems, account/billing systems, and the like, that may be deployed as part of the associated streaming network back office infrastructure 122. As illustrated, an example subscriber/operator management system 124 deployed in the back office infrastructure 122 may include an operator pipe and content policy node 126, a subscriber device profile and priority definition node 128, in addition to a streaming policy server node 134, a billing node 130 and a subscriber authentication node 136. A bandwidth decision manager 132 and a weighted fair queuing (WFQ) scheduler 138 may be configured to use data from the operator pipe and content policy node 126 and the subscriber device profile and priority node 128 to regulate bandwidth allocated to the CDN distribution pipes for carrying groups of content streams to the subscribers. Additional details with respect to allocating bandwidth on an outgoing CDN distribution pipe based on weights and priority levels associated with subscriber devices, content-based policies, dynamic resizing of the pipes using, e.g., one or more pipe control nodes, and scheduling based on WFQ techniques, may be found in one or more of the following commonly owned co-pending U.S. patent application(s): (i) "BANDWIDTH MANAGEMENT FOR OVER-THE-TOP ADAPTIVE STREAMING" (Ericsson Ref. No.: P39592-US1), application Ser. No. 13/845,320 filed Mar. 18, 2013, in the name(s) of Christopher Phillips et al., (ii) "REGULATING CONTENT STREAMS FROM A WEIGHTED FAIR QUEUING SCHEDULER USING WEIGHTS DEFINED FOR USER EQUIPMENT NODES" (Ericsson Ref. No.: P37772-US1), application Ser. No. 13/597,333 filed Aug. 29, 2012, in the name(s) of Christopher Phillips et al., (iii) "METHODS AND APPARATUS FOR MANAGING NETWORK RESOURCES USED BY MULTIMEDIA STREAMS IN A VIRTUAL PIPE" (Ericsson Ref. No.: P36357-US1), application Ser. No. 13/403,075 filed Feb. 23, 2012, in the name(s) of Christopher Phillips et al., and (iv) "METHODS, APPARATUS, AND COMPUTER PROGRAM PRODUCTS FOR ALLOCATING BANDWIDTH FOR PUSH AND PULL CONTENT REQUESTS IN A CONTENT DELIVERY NETWORK" (Ericsson Ref. No.: P39663-US1), application Ser. No. 13/856,895, filed Apr. 4, 2013, in the name(s) of Christopher Phillips et al., cross-referenced hereinabove and hereby incorporated by reference herein. In addition to the various subscriber/operator policy management and bandwidth scheduling functionalities set forth above, the back office infrastructure 122 may also comprise appropriate conflict detection and management nodes or systems as will be described in detail hereinbelow.

Continuing to refer to FIG. 1A, reference numeral 102 refers to one or more example client devices or user equipment (UE) devices that consume bandwidth provided via a bandwidth pipe associated with a subscriber/customer for consuming content delivered via CDN 140 in any type or number of access technologies including broad band access via wired and/or wireless (radio) communications. As such, UE devices 102 may be disposed as part of a content consumption environment served by a suitable ABR bandwidth pipe. For purposes of the present patent application, the terms "streaming client device" and "client device" may be used synonymously and may comprise any UE device or appliance that in one implementation not only receives program assets for live viewing, playback and/or decoding the content, but also operates as a command console or terminal that can accept user inputs, commands or requests to interact with a network element disposed in CDN 140 and/or the associated back office infrastructure 122 for requesting content that may be selectively rendered at one or more external audio/visual (A/V) devices 112-1 to 112-N. As such, UE devices 102 may be part of a customer premises (e.g., a home, an enterprise or organization, etc.) that is served by a bandwidth pipe allocated thereto wherein different devices may be streaming various types/categories of content at the same time or otherwise. Typically, such UE devices 102 may include one or more streaming client modules or applications 104 (e.g., an ABR streaming client application) and associated decoding functionalities 108 depending on the streaming technologies implemented, each operating in association with a processor module 106. An optional local display 110 (which may also be referred to as an internal or included display) may have the capability to render the video content in one or more resolutions (e.g., standard definition such as 480i, enhanced definition such as 480p, or high definition such as 720p and up). Further, the client devices 102 may also include appropriate structures and modules for obtaining identity information, capabilities information, etc. from the external A/V devices 112-1 to 112-N that may be used by the subscriber/operator policy management system 124 for selecting and/or provisioning appropriate bandwidth with respect to streaming a particular content program requested by the subscriber.

By way of further illustration, external A/V devices 112-1 to 112-N may comprise media rendering devices such as one or more high definition TV (HDTV) monitors with 1080i/1080p resolutions, one or more ultra high definition TV (UHDTV) monitors with 2160p, 4320p or 8640p resolutions, 3D TV monitors, HD/UHD video/cinema projectors, HD/UHD computer monitors, HD/3D Blu-ray Disc (BD) players, and auxiliary gaming/home entertainment displays, etc., that may be connected or communicatively coupled to the client devices 102 via any suitable wired or wireless technologies. Accordingly, reference numerals 120-1 to 120-N are illustrative of communication links between the client device 102 and the respective external A/V devices (which sometimes may also be referred to as "external rendering devices" or "connected display devices") that may comprise High-Definition Media Interface (HDMI) connections, Digital Visual Interface or Digital Video Interface (DVI) connections, FireWire connections, HD wireless connections utilizing unlicensed radio frequencies in 5 GHz, 60 GHz or 190 GHz bands, wireless HDTV (also referred to as WiDi) connections, Wireless Home Digital Interface (WHDI) connections, Digital Living Network Alliance (DLNA)-compliant connections, as well as other proprietary connections such as Apple® AirPlay connections, and the like. Depending on the functionality, an external A/V device may or may not include a decoding capability, and may or may not include both audio and video rendering capabilities. For purposes of illustration, external A/V devices 112-1 to 112-N are each exemplified with respective decoder blocks 116-1 to 116-N. Additionally, blocks 114-1 to 114-N are illustrative of storage areas of respective external A/V devices 112-1 to 112-N that contain display device information (DDI) including device identity information, rendering/decoding capabilities information and other information (collectively referred to as "external device information" or "metadata"). Example pieces of DDI may therefore comprise A/V device's manufacturer name, serial number, product type, phosphor type, filter type, supported A/V decoding and format information, display timing information, display screen size, display screen aspect ratio, luminance data and pixel mapping data, among others. One skilled in the art will recognize that storage areas 112-1 to 112-N may be implemented in a number of ways including but not limited to, using persistent memory such as built-in or integrated read-only memory (ROM) circuits, erasable programmable read-only memory (EPROM) circuits, Flash memory circuits, as well as external memory cards, and the like, wherein the device data may be downloaded, uploaded, updated, and/or reconfigured by third-party device vendors, via wireless means (over-the-air, for example) or over the Internet.

In general operation, the client devices 102 and associated CDN and back office infrastructure 122/140 may be configured to effectuate adaptive streaming of content as follows. Initially, source content is transcoded or otherwise encoded with different bit rates (e.g., multi-rate transcoding). For example, a particular content may be transcoded into five video files using variable bit rates, ranging from low to high bit rates. The particular content is therefore encoded as five different "versions" or "formats", wherein each bit rate is called a profile or representation. The encoded content is divided into fixed duration segments or chunks, which are typically between two and ten seconds in duration. One skilled in the art will recognize that shorter segments may reduce coding efficiency whereas larger segments may impact the adaptability to changes in network throughput and/or fast changing client behavior. Regardless of the chunk size, the segments may be Group-of-Pictures (GOP)-aligned such that all encoding profiles have the same segments. A suitable Manifest File is created that describes the encoding rates and Universal Resource Locator (URL) pointers relative to the various segments of encoded content. In one implementation, the Manifest File (MF), a Delivery Format (DF) and means for conversion from/to existing File Formats (FF) and Transport Streams (TS) may be provided to a specific client device 102 when a particular content is requested, which uses HTTP to fetch the encoded segments from the content provider network, provided there is no bandwidth conflict with respect to the bandwidth pipe serving the premises. The received segments may be buffered, as needed, and decoded and played back (i.e., rendered) in sequence, either at the local display 110 or at any one or several of the external A/V devices (112-1 to 112-N). The ABR streaming client module 104 may be designed to select an optimum profile of each segment so as to maximize quality without risking buffer underflow and staffing (i.e., rebuffering) of the play-out. Each time the client device 102 fetches a segment, it may choose the profile based on the measured time to download the previous one or several segments. Additionally, the client device 102 is operable to provide the external A/V device information to the back office infrastructure 122 as part of its session request in order to enable or facilitate a management node, e.g., a streaming policy server, along with a bandwidth scheduler, to effectuate a number of streaming policy management operations, such as, e.g., determining, provisioning and allocating a bandwidth or setting a bandwidth capacity limitation, determining/assigning a suitable priority weights for streaming requested content, determining an appropriate version of the particular content program for streaming, and the like.

Figure 1B:
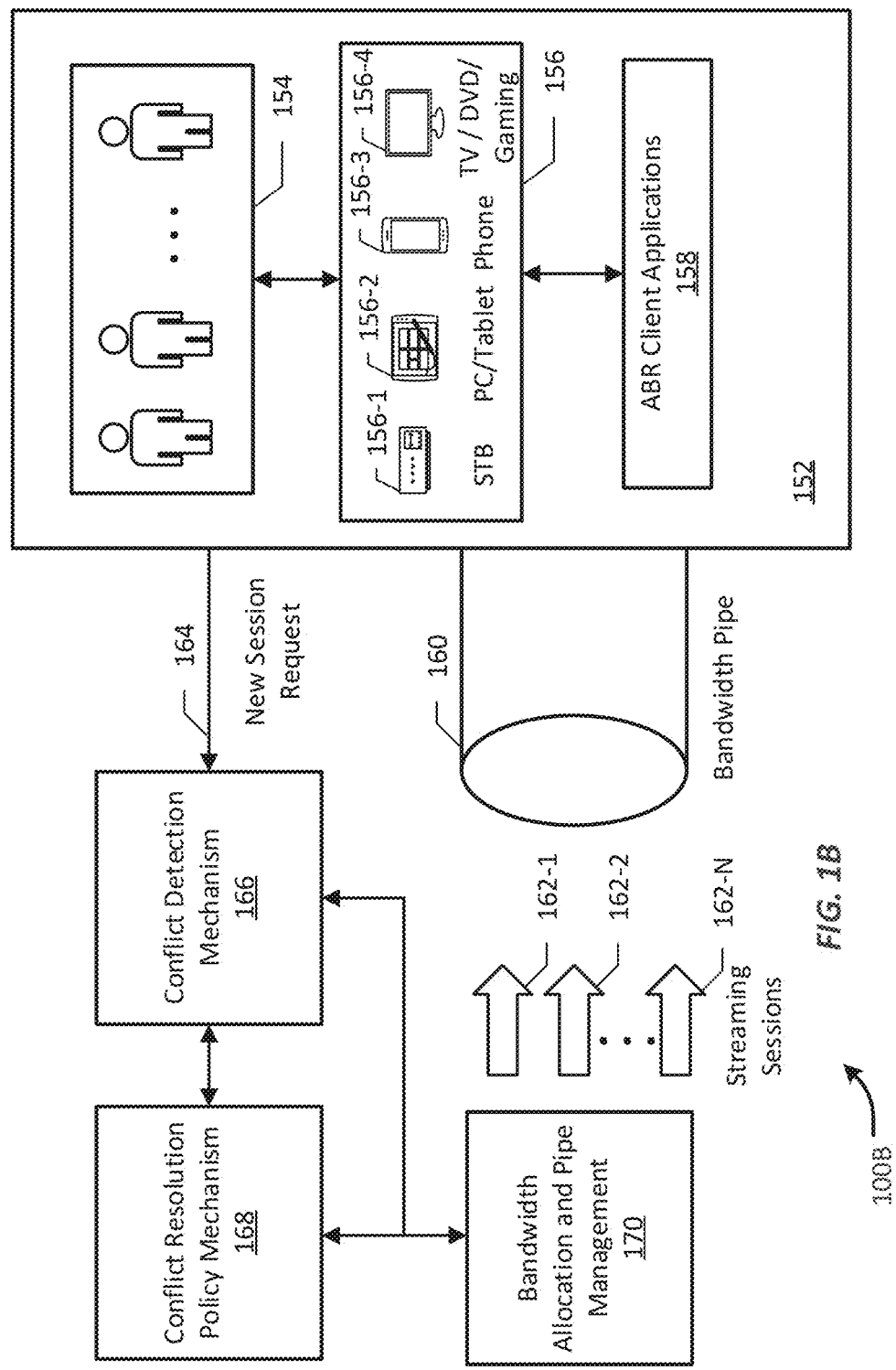
FIG. 1B depicts an example customer premises having one or more ABR streaming clients and a plurality of network elements that may be configured to manage conflict resolution in an ABR streaming environment with respect to a bandwidth pipe serving the customer premises.

FIG. 1B depicts an example network arrangement 100B that illustrates a customer premises 152 having one or more ABR streaming clients and a plurality of network elements that may be configured to manage conflict resolution in an ABR streaming environment with respect to a bandwidth pipe 160 serving the customer premises 152. It should be appreciated by one skilled in the art that in some aspects the example network arrangement 100B is another realization of the ABR streaming network environment 100A shown in FIG. 1A. By way of illustration, customer premises 152 may include a plurality of users 154 operating one or more client devices 156 (e.g., STB units 156-1, PC/tablets 156-2, smartphones 156-3 and TV/DVD/Gaming consoles 156-4, etc.), that exemplify UE devices 102 in HG. 1A, wherein each client device may be configured to execute one or more ABR client applications 158 for purposes of streaming content (i.e., as ABR clients) from one or more content servers. A plurality of streaming sessions 162-1 to 162-N are illustrative of the sessions launched by at least a subset of the users 154 using appropriate combinations of client devices 156 and streaming clients 158, which sessions may involve content streams at different bitrates or bandwidth depending on the type of content, devices, priority weights associated therewith, and/or other subscriber/operator policies implemented as part of a bandwidth allocation and pipe management system 170. Typically, priority users or users streaming priority content may be allowed to have more bandwidth than non-priority users, for example, within the bandwidth pipe 160 serving the premises 152. When a new session request 164 is initiated, for example, by a new client application running on the same client device or on a new client device, a conflict detection mechanism 166 is operative to detect if there is any bandwidth conflict with respect to one or more clients. In one example implementation, a virtual simulation of the bandwidth consumption through the pipe may be performed using, for instance a WFQ-based or similar bandwidth management system, assuming the new client (with it's own specific requirements) being added. If any conflict is detected (e.g., bandwidth policy requirements of one or more clients applications is predicted to be unmet if the new client were to be added), a conflict resolution policy mechanism 168 is operative to effectuate certain actions to address the impending potential bandwidth conflict according to one or more embodiments of the present patent application as will be set forth in additional detail below.

Figure 2:
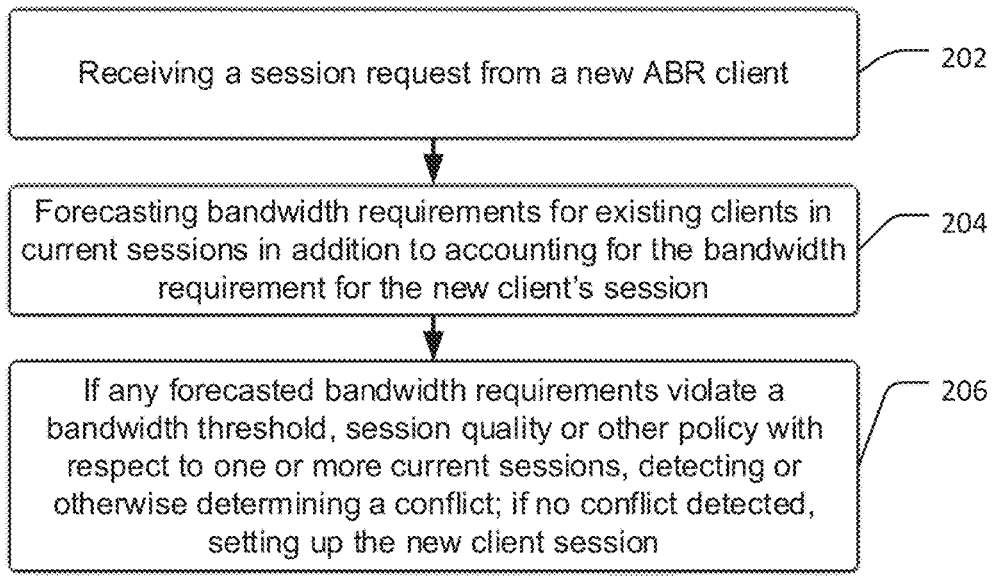
FIGS. 2-5 depict flowcharts of various blocks, steps and/or acts that may be combined in one or more arrangements that illustrate example conflict detection and resolution methods according to one or more embodiments of the present patent disclosure.

FIGS. 2-5 depict flowcharts of various blocks, steps and/or acts that may be combined in one or more arrangements that illustrate example conflict detection and resolution methods according to one or more embodiments of the present patent disclosure. In FIG. 2, reference numeral 200 generally refers to at least a portion of a conflict detection process in one embodiment. At block 202, a session request from a new ABR client launched in a customer premises that includes one or more existing ABR clients (i.e., ABR clients currently engaged in corresponding streaming sessions) is received in an example streaming network environment. At block 204, a forecasting mechanism is initiated whereby bandwidth requirements for one or more ABR clients, including the existing ABR clients as well as the new ABR client in one example implementation, are modeled, simulated or otherwise estimated upon taking into account a bandwidth requirement for the requested session by the new ABR client. As pointed out previously, a virtual simulation using WFQ techniques or similar bandwidth management system set forth in one or more related, commonly-assigned patent applications referenced hereinabove may be utilized in effectuating the forecasting mechanism. Furthermore, an example forecasting mechanism may incorporate A/V device display information relative to where the requested session will be rendered, provided such information is made available, e.g., via the session request. If any forecasted bandwidth requirements violate a policy regarding the users, streaming session bitrate requirements or bandwidth thresholds, QoS, or any combination thereof, a potential conflict may be detected or otherwise determined (block 206). If no potential conflict is determined to exist, a new streaming session pursuant to the session request may be established with the new client in any known or heretofore unknown streaming techniques (block 206).

Figure 3:
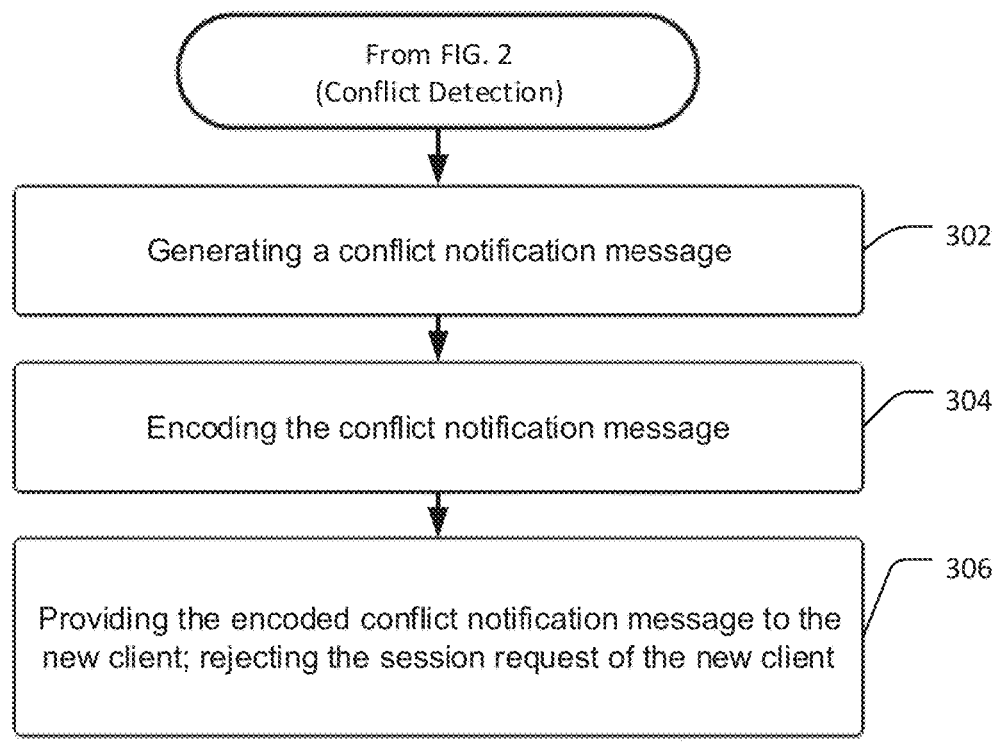
Figure 4:
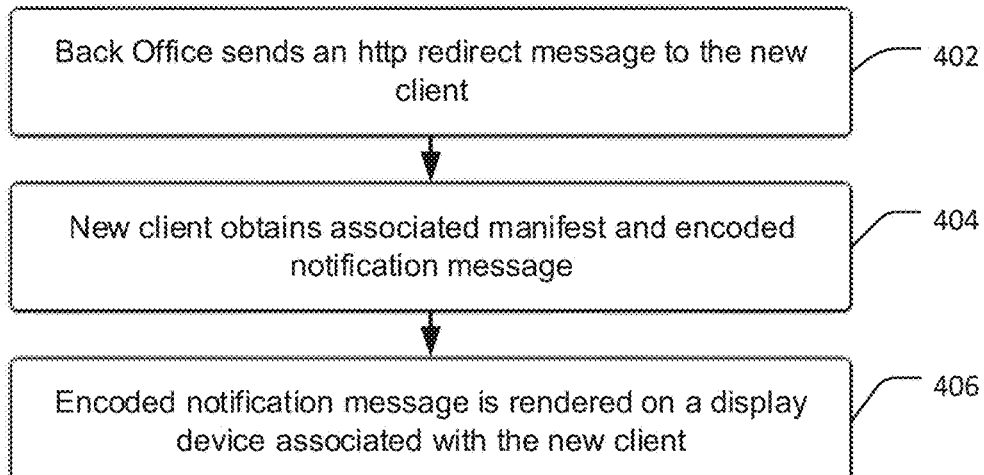

FIG. 3 depicts an example conflict notification mechanism 300 that may be utilized where a generic or legacy ABR client launches a new session request. Responsive to detecting or otherwise determining that an impending conflict exists as set forth in the flowchart of FIG. 2, a conflict notification message may be generated (block 302) at a suitable location within the ABR back office infrastructure as will be set forth in detail below. Broadly, the conflict notification message may comprise a video-encoded still image of a message (text, graphics, etc.) to the effect that the session request from the new ABR client is being rejected on account of a bandwidth conflict relative to the premises. For instance, such a message may indicate the total number of existing sessions in addition to the text that there is not enough bandwidth to watch the requested content. The video-encoded still image, which may be encoded at a low bitrate, may be provided or otherwise delivered to the new client for display on a designated A/V device, in addition to the new client's session request being rejected (block 306). Reference numeral 400 shown in FIG. 4 generally refers to at least a portion of blocks, steps and/or acts that may be involved in the delivery of a video-encoded still message for purposes of conflict notification according to one embodiment. An ABR back office is operative to send a HyperText Transfer Protocol (HTTP) message (e.g., http redirect message) to the new ABR client whose session request is rejected (block 402). Responsive to the redirect message, the new ABR client obtains a manifest file including the URL(s) corresponding to the encoded conflict notification message (block 404). Subsequently, the new ABR client obtains the encoded conflict notification message segments based on the URL(s) indicated in the manifest file, which are then rendered on a display device associated therewith (block 406).

Figure 5:
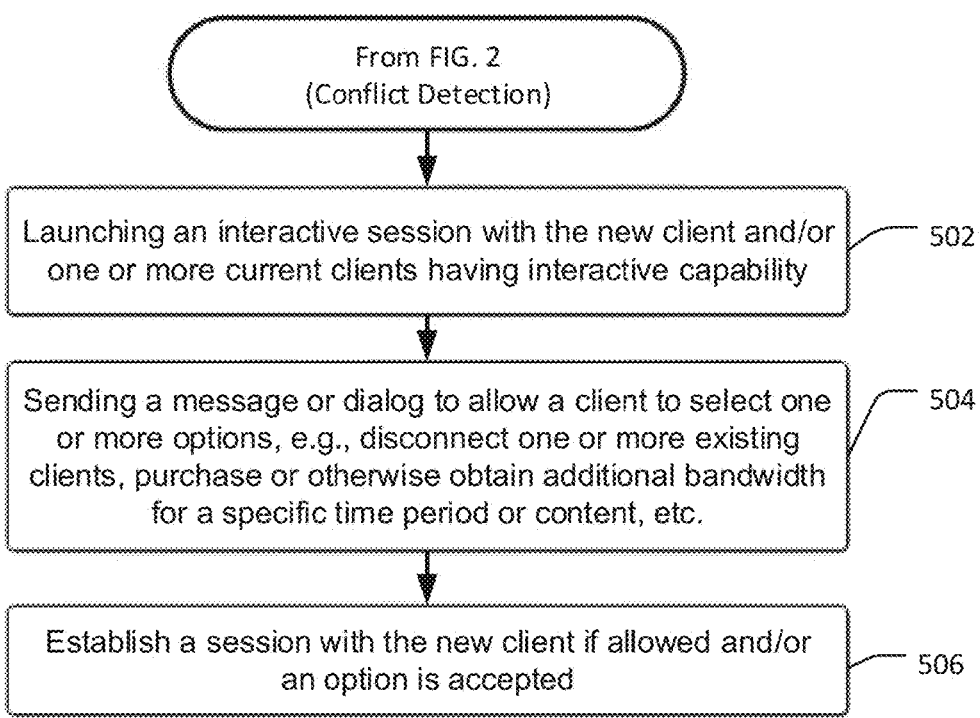

FIG. 5 depicts an example conflict resolution mechanism 500 that may be utilized where a custom ABR client having interactive capabilities launches a new session request. Responsive to detecting or otherwise determining that an impending conflict exists regarding the session request as set forth in FIG. 2, an interactive session may be launched with the new ABR client and/or one or more existing ABR clients (e.g., if they are also custom clients having interactivity) (block 502) in respect of the session request. As set forth at block 504, a dialog or message box having pull-down menus, query/response options, etc., may be presented to the user(s) over the Internet, wherein a number of options, choices, actions, etc. may be offered to the users. For example, the new ABR client user may be presented with the total number of currently active streaming sessions, identity of users and/or client devices associated with the streaming sessions, particular content being streamed, priority/preference levels, etc., in addition to an option to select one or more existing clients to terminate or otherwise deactivate the streaming sessions associated therewith. Yet another option may involve offering a point-of-sale purchase transaction to the user whereby the user can choose to purchase a specific bandwidth upgrade (e.g., for a time period or for the duration of the particular content requested, etc.). Upon accepting an option input by the user, and responsive thereto, a suitable action may be effectuated with respect to the session request (block 506). By way of example, a new session may be established if the option input by the user allows for streaming of the requested content after disconnecting a selected existing session without violating the bandwidth requirements of the existing sessions (block 506).

It should be appreciated that the foregoing blocks, steps and/or acts of FIGS. 2-5 may be arranged or re-arranged in several combinations, which may be executed at different locations or at co-located network elements or nodes within a streaming network environment such as the example network environments illustrated in FIGS. 1A and 1B. Additional details with respect to one or more of such embodiments may be exemplified in view of FIGS. 6-13 described below.

Figure 6:
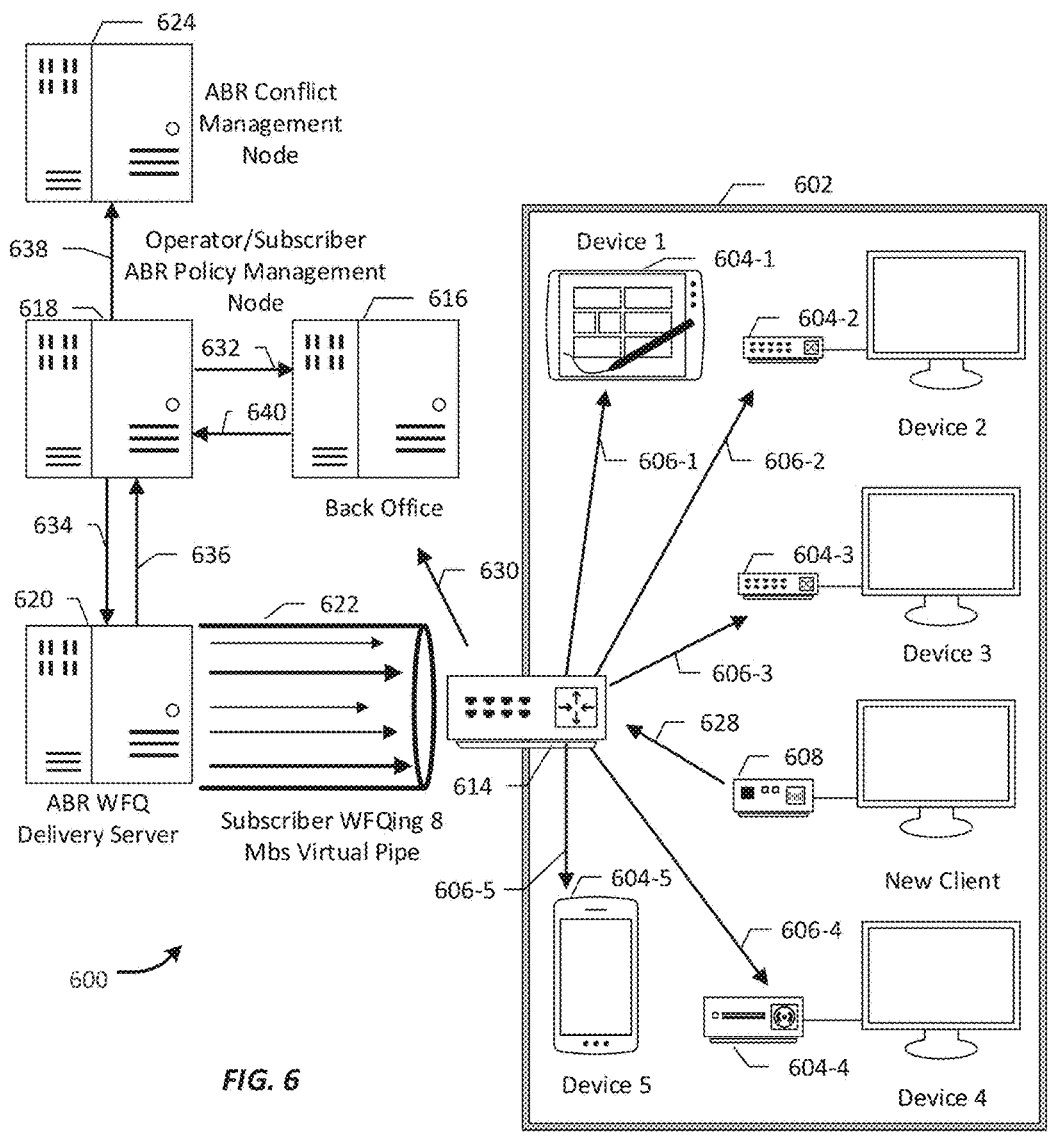
FIG. 6 depicts an example ABR streaming environment with additional details for practicing an embodiment of the present patent disclosure.

Taking reference to FIG. 6, an example subscriber home premises 602 includes a plurality of client devices, e.g., devices 604-1 to 604-5, engaged in respective streaming sessions in an ABR streaming environment 600, wherein an 8 Mbs virtual pipe 622 is operative to serve the premises 602 via a suitable gateway 614. By way of illustration, device 604-1 may be a tablet having a streaming session 606-1 for content having a priority level 3; device 604-2 may be a Blu-Ray Disc (BD) player coupled to a 1080p TV display and having a streaming session 606-2 for content having a priority level 1; device 604-3 may be another BD player coupled to a 720p TV display and having a streaming session 606-3 for content having a priority level 2; device 604-4 may be a set-top box (STB) coupled to a 480i TV display and having a streaming session 606-4 for content having a priority level 3; and device 604-5 may be a smartphone having a streaming session 606-5 for content having a priority level 4. A subscriber/operator ABR policy management node or system 618 may be configured to maintain appropriate priority-to-weight mapping relationships that may be used in bandwidth scheduling, as illustrated by Table 1 below:

TABLE I

| Priority Level | Weight |
|---|---|
| Priority 1 | 3.0 |
| Priority 2 | 1.75 |
| Priority 3 | 0.875 |
| Priority 4 | 0.4375 |

The subscriber/operator ABR policy management node 618 may also maintain a messaging delivery policy that assigns a relatively low messaging weight (e.g., weight 0.2) with respect to message transmission. Further, a bitrate threshold policy may establish a defined minimum video bitrate threshold of 0.4 Mbs that may be applied across all priority levels and weights. Additionally or alternatively, the bitrate threshold policy may comprise a more sophisticated approach wherein different priorities/weights may be accorded varying thresholds. For example, a higher video bitrate threshold may be established for high priority sessions in contrast to lower priority sessions that may have correspondingly lower bitrate thresholds, or vice versa.

Subscriber premises 602 also includes a client device 608, e.g., a PS3 gaming device coupled to a 1080p TV display, operative to request ABR assets from one or more content providers. When a new session request 628 is launched by device 608, it is propagated via gateway 614 to a back office 616 as exemplified by the request 630 that may include the connected TV display's DDI such as, including but not limited to, make/manufacture of the gaming device and connected display, resolution (e.g., 720p, 1080p, etc.), class/size (e.g., 52", 62", 73", etc.), and the like. Responsive thereto, a session ID (e.g., Session ID: XXX) may be assigned with respect to the new session request, which may be transmitted to the subscriber/operator ABR policy management node 618 via a policy management request 640. In an example implementation, the policy management request 640 may also include the requesting device/display information received as part of the session request 630. Service logic executing at the subscriber/operator ABR policy management node 618 may be configured to generate, responsive to the policy management request 640 received from the back office node 616, a bitrate forecasting request 634 to a forecasting module that may be implemented at different locations with respect to the ABR streaming environment 600. As will be described in detail below, such a forecasting module may be provided as part of a premises gateway or a CON edge/delivery node. For purposes of FIG. 6, an ABR delivery server functionality 620 that facilitates the WFQ-based bandwidth pipe 622 serving the premises 602 is exemplified as having the bitrate forecasting capability. By way of illustration, the ABR delivery server functionality 620 is operative to manage a plurality of streams of different bandwidth comprising the bandwidth pipe 622 that correspond to the existing sessions of the client devices 604-1 to 604-5 (e.g., five streams represented by arrows of varying thickness, denoting bandwidths 1.009 Mbs, 3.459 Mbs, 2.018 Mbs, 1.009 Mbs and 0.504 Mbs, which reflect the different priority/weight factors associated with the respective sessions).

Appropriate forecasting logic executing at the ABR delivery server functionality 620 may be configured to generate a bitrate forecast response 636 to the operator/subscriber ABR policy management node 618 that includes various bitrates forecasted for the current as well as the requested sessions. Tables II and III below are illustrative of the various pieces of information that may be provided as part of an example a bitrate forecast response 636:

TABLE II

| Current Sessions | | | |
|---|---|---|---|
| Session ID | Device/Display | Weight | Bitrate |
| Current session ID 1 | Device-1 | 3.0 | 2.425 Mbs |
| Current session ID 2 | Device-2 | 1.75 | 1.409 Mbs |
| Current session ID 3 | Device-3 | .875 | .704 Mbs |

TABLE II-continued

| Current Sessions | | | |
|---|---|---|---|
| Session ID | Device/Display | Weight | Bitrate |
| Current session ID 4 | Device-4 | .875 | .704 Mbs |
| Current session ID 5 | Device-5 | .4375 | .352 Mbs |

TABLE III

| New Session Request | | | |
|---|---|---|---|
| Session ID | Device/Display | Weight | Bitrate |
| Session ID XXX | PS3/HDTV | 3.0 | 2.415 Mbs |

Responsive to receiving the bitrate forecast response 636, the operator/subscriber ABR policy manager node 618 is operative to detect or otherwise determine whether there is an impending conflict with respect to the new session request. For example, if the defined minimum video bitrate threshold is 0.4 Mbs, it can be seen that the forecasted bitrate for the streaming session ID 5 is below that threshold after accounting for the new session. Accordingly, a determination may be made that a potential conflict exists pursuant to the new session request. Thereafter, the operator/subscriber ABR policy management node 618 is operative to generate one or more notifications or responses depending on how an embodiment of conflict management/resolution functionality may be distributed or localized within the ABR network. Illustratively, a separate conflict management node 624 may be provided that is configured to receive a notification 638 (e.g., "User Bitrate Exceeded" notification) that includes the various pieces of information received from the forecasting functionality. Further, the operator/subscriber ABR policy management node 618 may also be configured to generate a policy management response 632 to the back office node 616, which includes an indication that there is a potential conflict with respect to the new session request (having the Session ID XXX).

Figure 7:
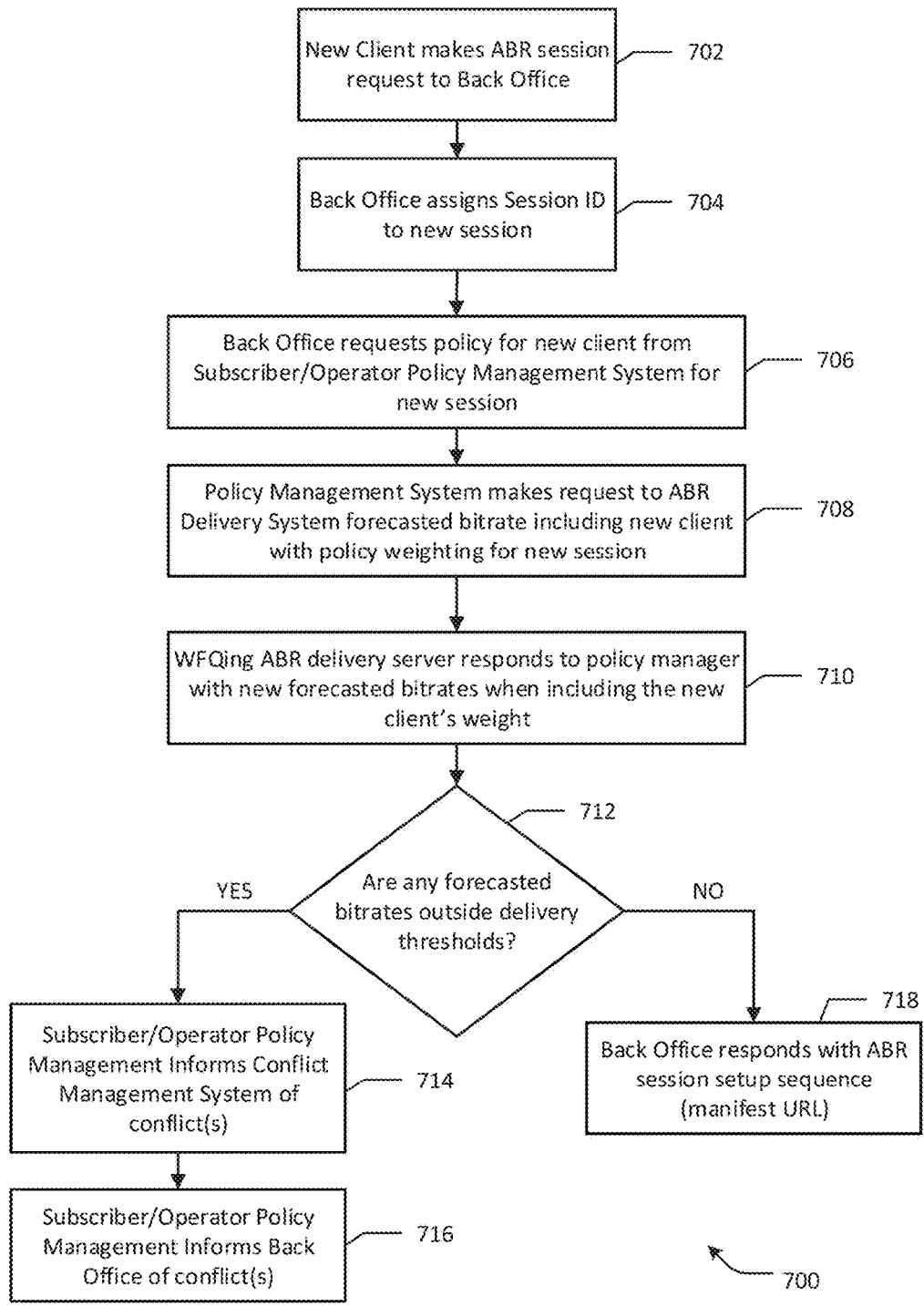
FIG. 7 depicts a flowchart of various blocks, steps and/or acts illustrative of additional details with respect to an embodiment of a conflict detection scheme according to an embodiment of the present patent disclosure.

FIG. 7 depicts a flowchart of various blocks, steps and/or acts illustrative of additional details with respect to an embodiment of a conflict detection scheme 700 in view of the example ABR streaming environment 600 described above. At block 702, a new client makes an ABR session request to a back office, which assigns a session ID thereto (block 704). The back office requests a policy for the new client from the subscriber/operator policy management system or policy manager (block 706). Responsive thereto, the subscriber/operator policy management system generates a request to an ABR delivery server/system for forecasted bitrate information, wherein the request includes the new client session ID and policy weighting information for the requested session (block 708). The ABR delivery server responds to the policy manager with forecasted bitrates based on network simulation etc. that includes a weight assigned to the new client's session (block 710). A determination may be made as to whether any forecasted bitrates are outside audio and/or video delivery thresholds (block 712). If there is no violation of the applicable thresholds, the back office may generate a response to the new client including a suitable ABR session setup sequence (e.g., providing one or more manifest files including URLs to the requested content), as set forth at block 718. Otherwise, the policy manager informs a conflict manager node and the back office node appropriately (blocks 714 and 716), as described above.

Figure 8:
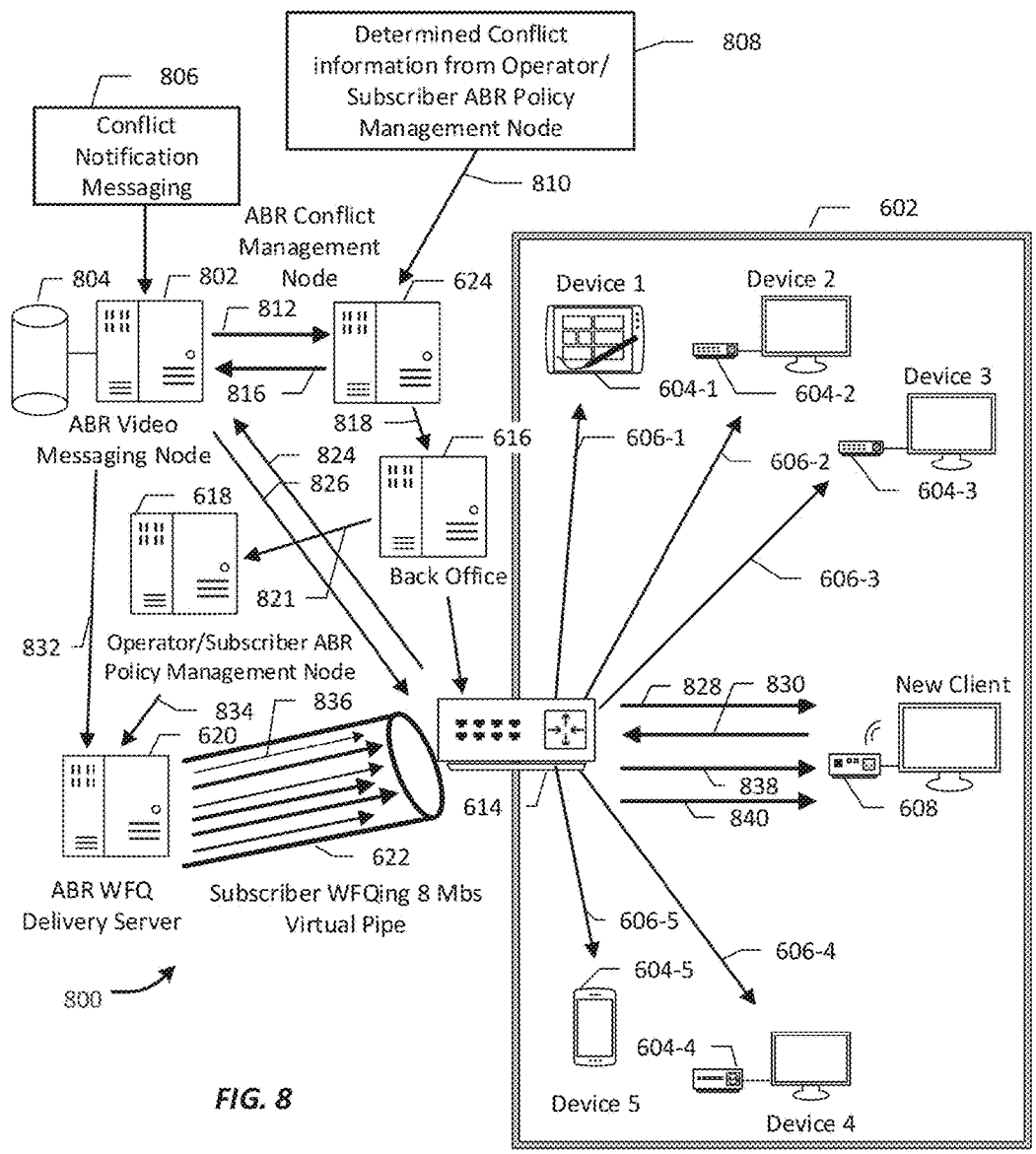
FIG. 8 depicts the example ABR streaming environment of FIG. 6 with additional details relative to an embodiment of a conflict resolution scheme according to an embodiment of the present patent disclosure.

FIG. 8 depicts an example ABR streaming environment 800 with additional details relative to an embodiment of a conflict resolution/management scheme according to the teachings of the present patent disclosure. As will be realized by one skilled in the art, the example ABR streaming environment is substantially similar to the streaming environment 600 of FIG. 6 described above. Accordingly, at least certain portions of the description of FIG. 6 are equally applicable with respect to the streaming environment 800, mutatis mutandis. Focusing on the aspects relating to conflict resolution after a potential conflict has been detected, the example embodiment of FIG. 8 is illustrative of the scenario where a video-encoded still image of a conflict notification message may be provided to the requesting new client 608 of subscriber premises 602. Upon receiving a potential conflict notification including various pieces of forecasted bitrate information with respect to a new session request (as exemplified by reference numerals 808 and 810) from the operator/subscriber policy manager 618, the ABR conflict management node 624 is operative to transmit an encode message request 816 to an ABR video messaging system or node 802 for generating and encoding a suitable conflict notification message. A still image containing the conflict notification message (e.g., "Your home has Five ABR video sessions active. There is not enough bandwidth to watch your video.") may be encoded using an appropriate video bitrate that is sufficiently low such that its streaming to the client device via bandwidth pipe 622 does not impact the quality of the existing sessions. An appropriate mechanism (e.g., Kush Gauge calculation) may be utilized by a conflict notification messaging component 806 associated with the video messaging node 802 for computing a bitrate used in generating the video-encoded image of the conflict notification message that may be stored at a database 804, including its manifest and video message segments therefor. An encode message response 812 may be provided to the conflict management node 624 including a URL to the message manifest, which is propagated to the back office 616, as indicated by a response message 818 containing the requested session's ID (e.g., Session ID: XXX as referenced in the description of FIG. 6 above). The back office 616 thereafter generates a notification 821 to the operator/subscriber policy manager node 618, in addition to transmitting an HTTP redirect message to premises gateway 614, (e.g., using an http response status code 302 that includes a URL in its location header field for the notification message manifest), which is propagated to the new client device 608, as illustrated by reference numeral 828. Messages 830, 824 are illustrative of the http message propagated to the video messaging node 802 for requesting the manifest (e.g., http://xxx.xxx.xxx.xxx/message/manifest.xxx) and messages 826, 838 are illustrative a response message including the manifest from the video messaging node received by the client device 608. Responsive to the received message manifest file, the new client 608 is operative to receive the video-encoded image of the conflict notification message, based on the interaction of the video messaging server 802, operator/subscriber policy manager node 618 and the delivery server 620, as a separate stream 836 of the bandwidth pipe 622. Pursuant to this interaction, the delivery server 620 receives via path 832 encoded video message segments of the conflict notification message from the video messaging node 802 and applicable data (e.g., subscriber device data, session ID and a weight associated with the notification message stream 836) via a notification 834 from the operator/subscriber policy manager node 618. As the conflict notification message stream 836 is propagated via gateway 614 to the client device 608 (as a streaming session 840 having a low bandwidth, e.g., 0.2239 Mbs), the image may be rendered at the connected HDTV display that shows the message: Your home has Five ABR video sessions active. There is not enough bandwidth to watch your video. In an example implementation, as the message image is being displayed on the connected display device, the new client application may remain active although its new session request has been rejected by the back office 616.

Figure 9:
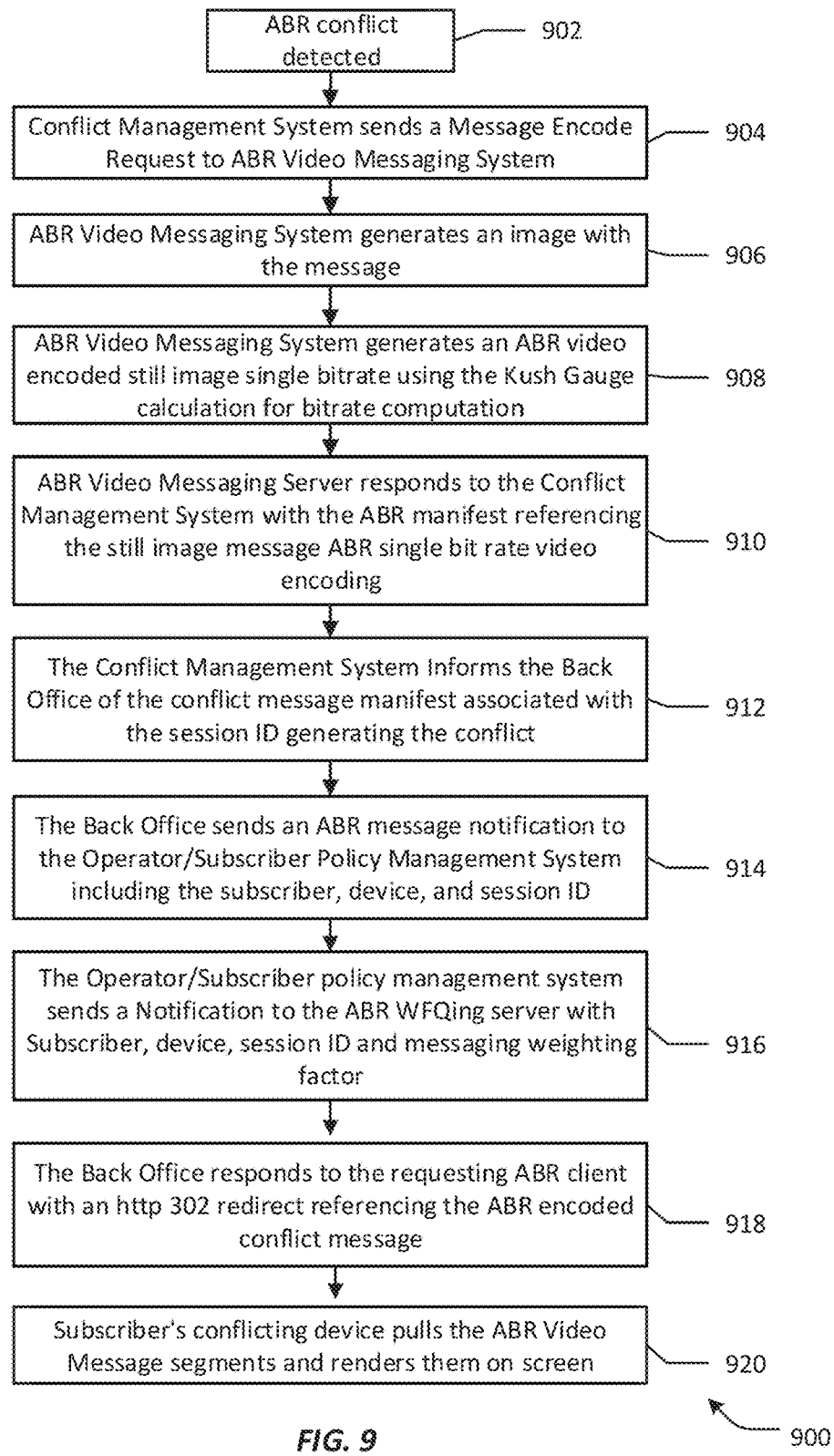
FIG. 9 depicts a flowchart of various blocks, steps and/or acts illustrative of additional details with respect to an embodiment of a conflict resolution scheme according to an embodiment of the present patent disclosure.

FIG. 9 depicts a flowchart of various blocks, steps and/or acts illustrative of additional details with respect to an embodiment of a conflict resolution scheme 900 in view of the example ABR streaming environment 800 described above. Responsive to a conflict detection mechanism (block 902), a conflict management system or node sends a message encode request to an ABR video messaging server/system (block 904). An image of a suitable conflict notification message is generated, which is then video-encoded (block 908), e.g., using a single bitrate, based on a Kush Gauge calculation for bitrate computation, as exemplified below:

Bitrate in kbps=pixel count×motion factor (1, 2, or 4)×0.07/1000;

where the pixel count is the multiple of the video's width and height, the motion factor is an estimate of how fast the moving images are in a video. For an example message in Full SD resolution of 780×480, with a still image motion factor being 1, the expression computes to 24.192 kbps, which may applied for encoding the still image into video. It should be appreciated that low bitrates of up to 50 kbps may be used in typical legacy streaming client applications for inserting a video-encoded sill image of appropriate conflict notification message(s).

At block 910, the video messaging server responds to the conflict management system with an ABR manifest referencing the still image message encoded into video using the single bit rate computed according to the Kush Gauge calculation. At block 912, the conflict management node informs the back office of the conflict notification message manifest associated with the session ID generating the potential conflict. Thereafter, the back office sends an ABR message notification to the operator/subscriber policy management node including the subscriber, client device and session ID (block 914), which is propagated to a WFQing delivery server in a notification that also includes a suitable weighting factor for the delivery of the message (block 916). The back office further responds to the requesting ABR client with an http 302 redirect message, referencing the ABR encoded conflict notification message (block 918). Responsive thereto, the conflicting client device pulls the ABR video message segments for rendering on a display screen (block 920).

Figure 10:
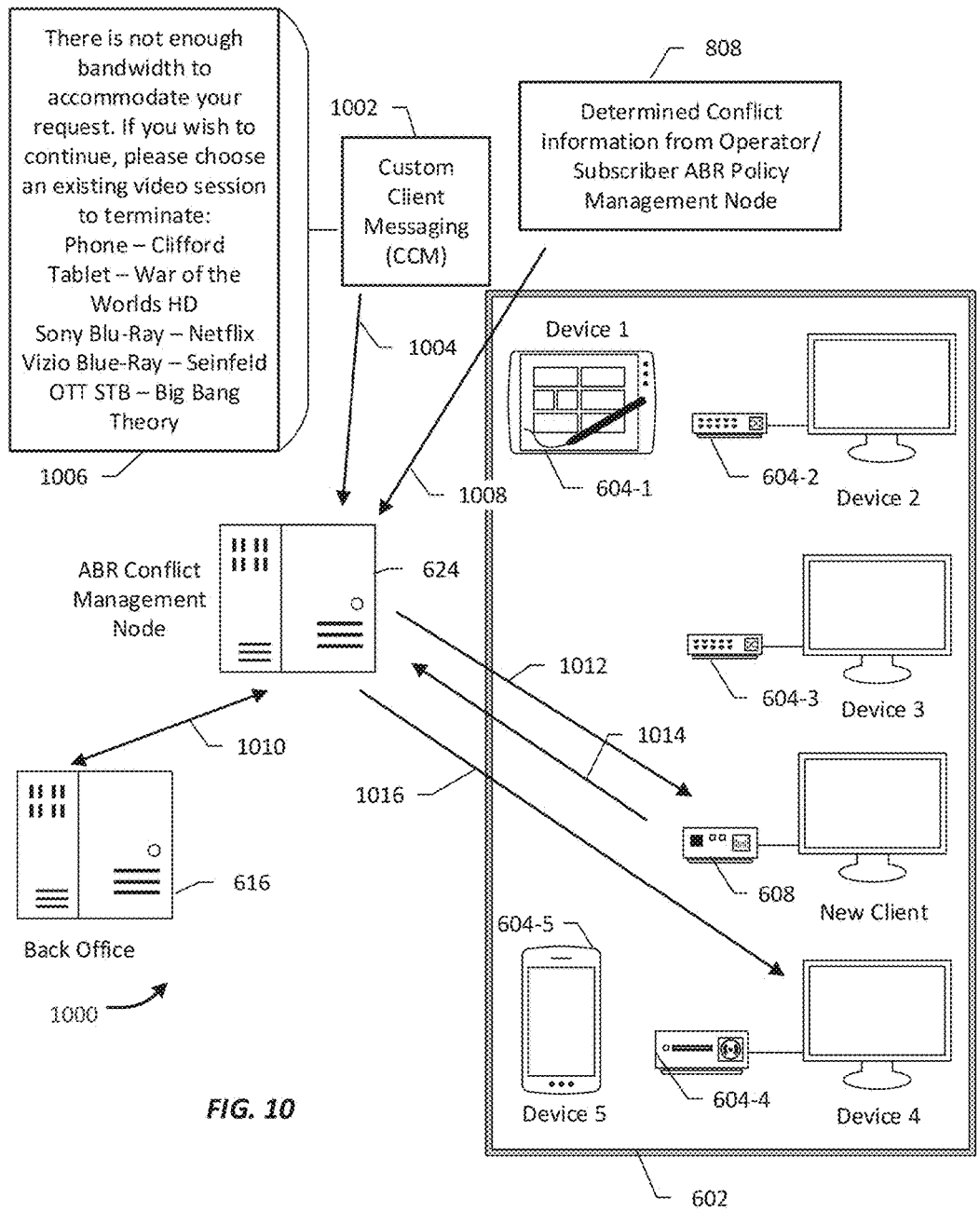
FIG. 10 depicts the example ABR streaming environment of FIG. 6 with additional details relative to an embodiment of a conflict resolution scheme according to another embodiment of the present patent disclosure.

FIG. 10 depicts an example ABR streaming environment 1000 with additional details relative to another embodiment of a conflict resolution/management scheme according to the teachings of the present patent disclosure. As before, the description of the streaming environments shown in FIGS. 6 and 8 is substantially applicable with respect to the streaming environment 1000, mutatis mutandis. Accordingly, focusing primarily on the aspects relating to conflict resolution after a potential conflict has been detected, the example embodiment of FIG. 10 is illustrative of the scenario where an interactive session may be launched with the conflicting new client and/or other existing clients having custom/interactive capabilities. Upon receiving a potential conflict notification including various pieces of forecasted bitrate information with respect to a new session request (as exemplified by reference numerals 808 and 1008), the ABR conflict management node 624 is operative to initiate an interactive session with the new client 608 (e.g., via the Internet) whereby a customized message dialog box may be provided for facilitating user selection with respect to a variety of options, actions, etc. A custom client messaging (CCM) module 1002 associated with the ABR conflict management node 624 may be provided to generate an example dialog box 1006 that allows for selecting an existing video session to terminate. As described previously, other options may also be provided for user selection depending on a specific implementation. Reference numerals 1012 and 1014 in FIG. 9 are illustrative of an interactive session wherein the user of the client device 608 selects a particular existing session, e.g., OTT STB session with client device 604-4, for termination. Responsive to user selection message 1014, the ABR conflict manager node 624 generates a client disconnect message 1016 to the OTT STB client 604-4. In addition, the ABR conflict manager node 624 also sends a disconnect decision message 1010 to the back office 616 that references the client device identified for disconnection as well as the Session ID.

Figure 11:
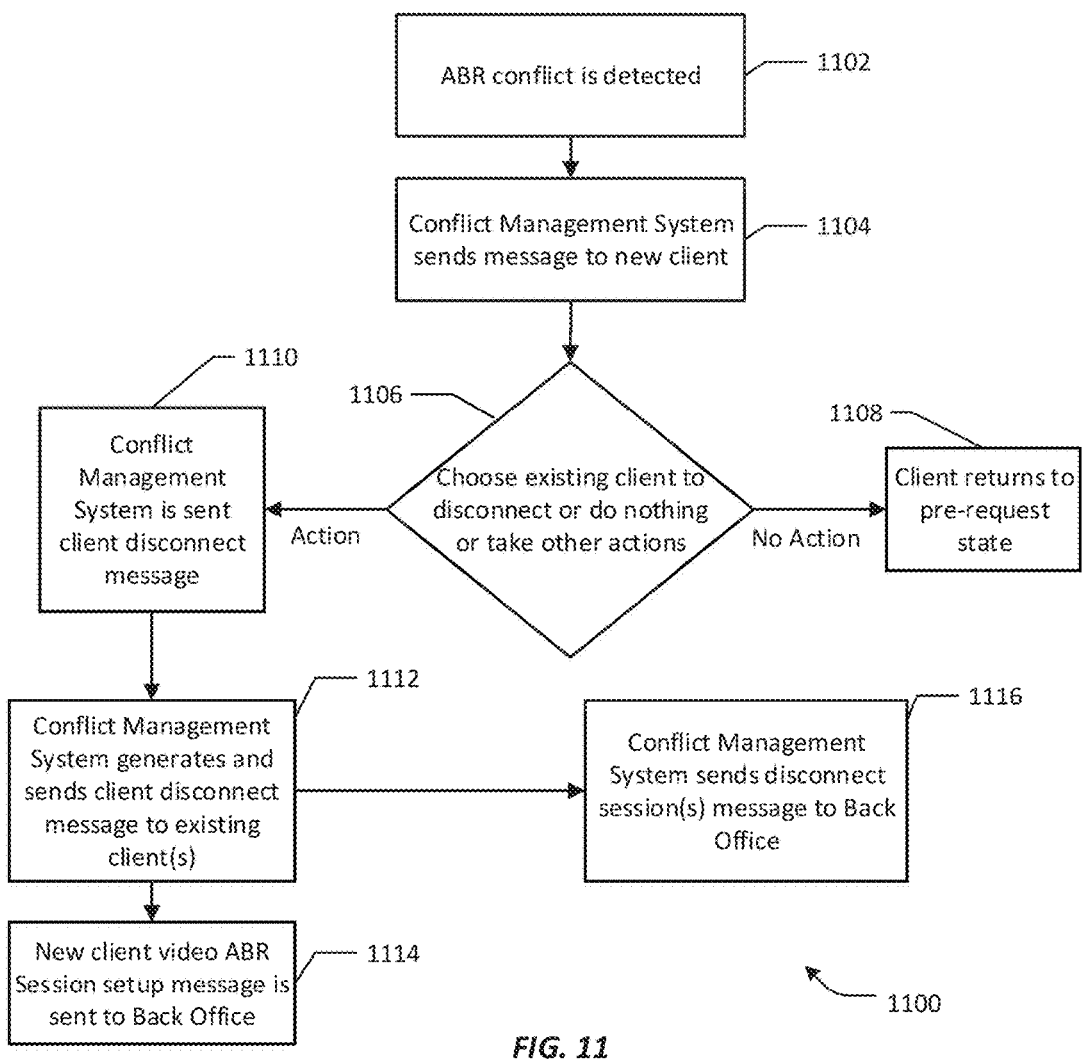
FIG. 11 depicts a flowchart of various blocks, steps and/or acts illustrative of additional details with respect to another embodiment of a conflict resolution scheme according to an embodiment of the present patent disclosure.

FIG. 11 depicts a flowchart of various blocks, steps and/or acts illustrative of additional details with respect to an embodiment of a conflict resolution scheme 1100 in view of the example ABR streaming environment 1000 described above. Responsive to a conflict detection mechanism (block 1102), a conflict management system or node sends an interactive session message to the conflicting ABR client (block 1104), whereby a user of the client may input a suitable selection (block 1106). If no user action is taken, the ABR client returns to its pre-request state (block 1108). On the other hand, if a termination action is selected by the user, which may involve selecting more than one existing session for termination, the conflict management system receives the user input via a suitable disconnect message (block 1110). Responsive thereto, the client management system may send one or more client disconnect messages to the existing clients (block 1112), whereupon a new ABR session setup message may be sent to the back office for setting up the requested session (block 1114). It should be appreciated that a new ABR session setup message may be generated only when it has been ascertained that the terminated session frees up enough bandwidth such that adding the new session would not cause a conflict. Accordingly, in one further variation, an iterative selection and conflict verification scheme may be provided wherein a user may interactively select different sessions one by one for termination until appropriate bandwidth is released for accommodating the new session. Additionally, the conflict management system may be configured to send one or more disconnect session messages to the back office, as explained hereinabove (block 1116). Furthermore, if other actions are taken by the user in lieu of a termination action, e.g., a bandwidth purchase action, appropriate responses may then be effectuated by the system, as described previously.

Figure 12:
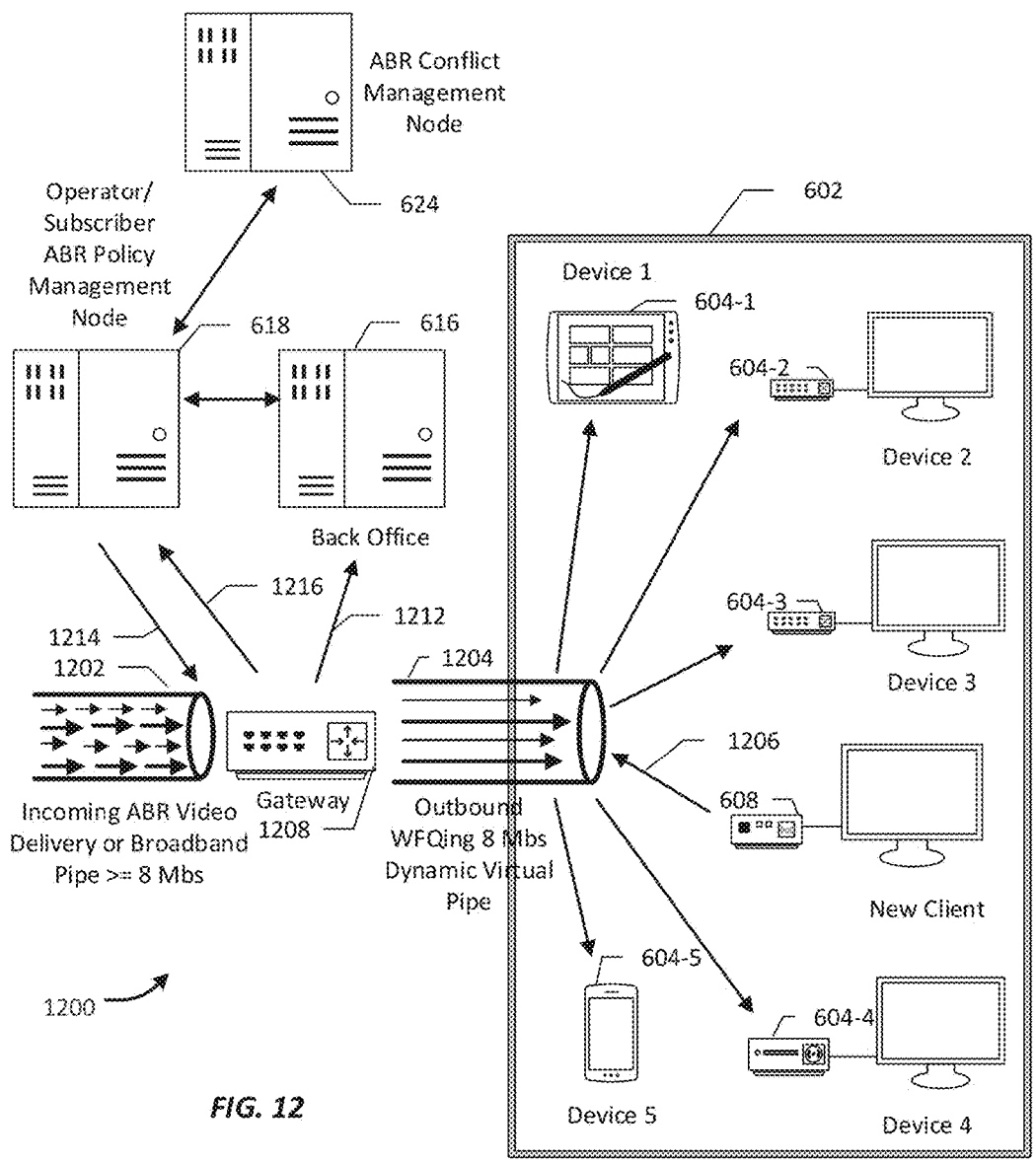
FIG. 12 depicts an embodiment of the example ABR streaming environment of FIG. 6 wherein certain aspects of conflict detection/resolution may be practiced at a premises gateway.

Turning to FIG. 12, depicted therein is an example ABR streaming environment 1200 that is substantially similar to the streaming environment of FIG. 6, wherein certain aspects of conflict detection/resolution may be practiced at a premises gateway 1208. In the embodiment of FIG. 12, appropriate bitrate forecasting functionality may be provided as part of gateway 1208 operative to manage an incoming ABR delivery or broad band pipe 1202 such that an outbound dynamic virtual pipe 1204 of suitable capacity is made available for consumption by the existing clients 604-1 to 604-5 and new client 608. Focusing on the various interactive functionalities of the streaming environment 1200, when the new client 608 initiates a session request 1206, gateway 1208 is configured to propagate the request to the back office 616, as exemplified by a message 1212 that includes the device, connected display information, etc. Responsive to appropriate policy management request/response interfacing with the back office 616, the operator/subscriber policy manager node 618 is operative to generate a bitrate forecast request 1214 to gateway 1208. Substantively similar to the forecast request 634 described previously with respect to the streaming environment 600 of FIG. 6, the bitrate forecast request 1214 may include the new client ID, device/display combination, in addition to appropriate priority/weight values associated with the requested session. Responsive thereto, the forecasting functionality executing at gateway 1208 is operative to generate a bitrate forecast response message 1216 similar to the bitrate forecast response 636 that includes various pieces of information, e.g., session IDs, predicted bitrates, etc., relative to the ongoing sessions as well as the requested session. Thereafter, appropriate interfacing among the operator/subscriber policy manager 618, conflict management node 624 and back office 616, is effectuated for purposes of conflict detection and resolution, as described hereinabove.

Figure 13:
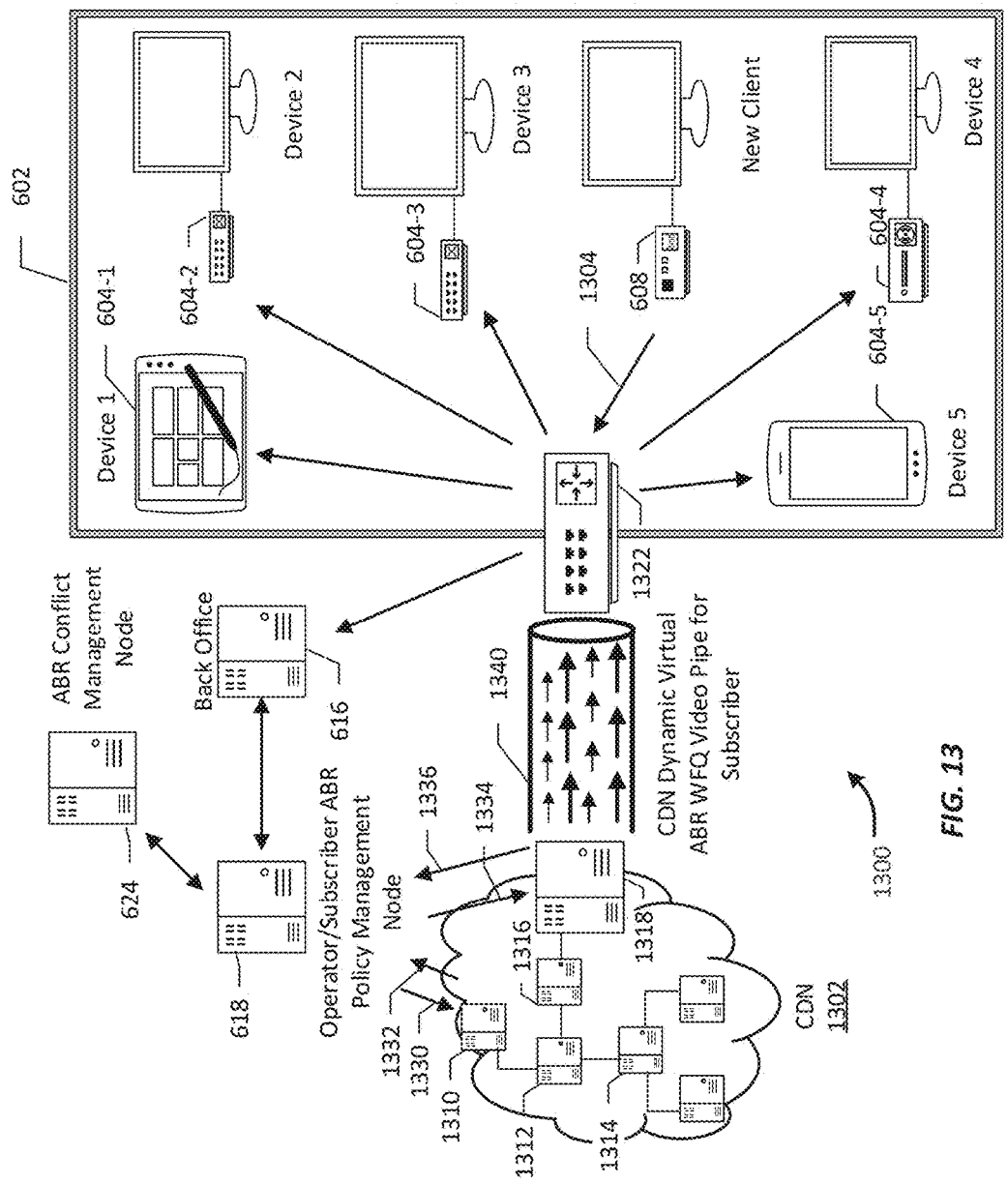
FIG. 13 depicts an embodiment of the example ABR streaming environment of FIG. 6 wherein certain aspects of conflict detection/resolution may be practiced at a CDN node.

FIG. 13 depicts an example ABR streaming environment 1300 that is substantially similar to the streaming environment of FIG. 6, wherein certain aspects of conflict detection/resolution may be practiced at a CDN node 1318. In the embodiment of FIG. 13, appropriate bitrate forecasting functionality may be provided as part of an edge/delivery node such as, e.g., node 1318, that serves to provide a dynamic virtual bandwidth pipe 1340 of suitable capacity with respect the customer premises 602 via a premises gateway 1322. Reference numerals 1310 and 1312 refer to a redirector node and a central origin server node, respectively, of CDN 1302, which includes a plurality of regional nodes, e.g., nodes 1314, 1316, coupled to the central server 1312. Further, the edge/delivery node 1318 is hierarchically coupled to the regional node 1316. Focusing on the various interactive functionalities of the streaming environment 1300, when the new client 608 initiates a session request 1304, gateway 1322 is configured to propagate the request to the back office 616, as described previously. Pursuant to appropriate policy management request/response interfacing with the back office 616, the operator/subscriber policy manager node 618 is operative to initially determine the location of the edge/delivery node 1318 by engaging in a query mechanism 1330 with the redirector node 1310 of CDN 1302. Upon identifying the edge/delivery node 1318 (e.g., Atlanta, Ga.) serving the customer premises 602, a response including the nodal location is provided to the operator/subscriber policy manager node 618. Thereafter, a bitrate forecast request 1334 is generated to the edge/delivery node 1318, substantively similar to the forecast requests 634, 1214 described previously with respect to the streaming environment 600, 1200 of FIGS. 6 and 12, respectively. Responsive thereto, the forecasting functionality executing at the CDN node 1318 is operative to generate a bitrate forecast response message 1336 similar to the bitrate forecast responses 636 and 1216. As before, appropriate interfacing among the operator/subscriber policy manager 618, conflict management node 624 and back office 616, is effectuated for purposes of conflict detection and resolution in accordance with the teachings hereinabove.

Figure 14:
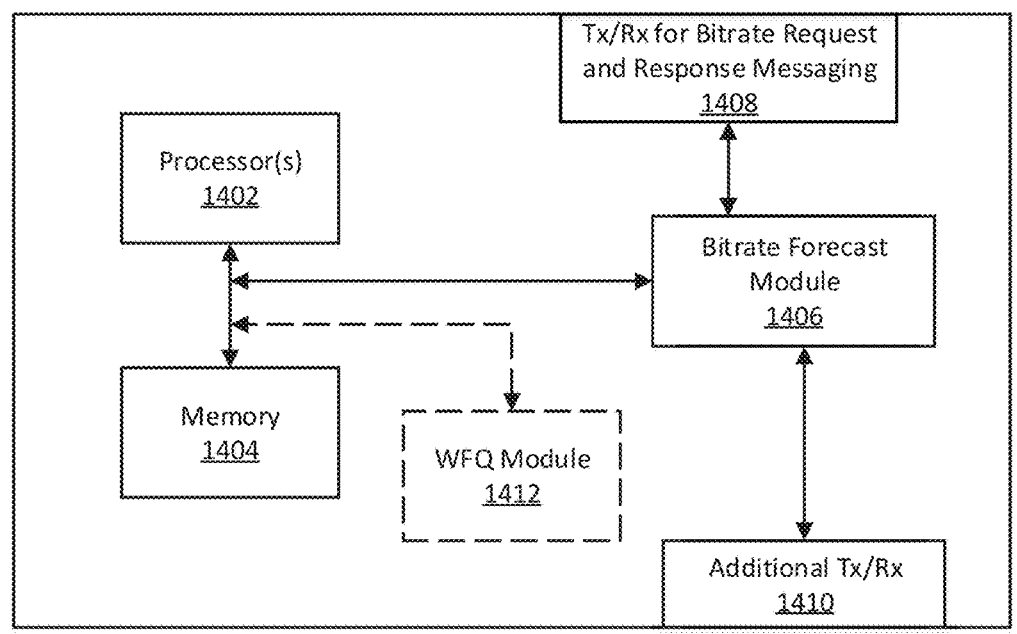
FIG. 14 depicts a block diagram of an example element configured to execute certain aspects of conflict detection/resolution according to one or more embodiments of the present patent application.

FIG. 14 depicts a block diagram of an example element or component 1400 that may be configured to execute certain aspects of conflict detection/resolution according to one or more embodiments of the present patent application. In one arrangement, component 1400 is illustrative of a CDN node (e.g., edge node 1318) that includes a bitrate forecast module 1406 and a bandwidth scheduling and pipe management module 1412, e.g., based on WFQ techniques. In another arrangement, component 1400 is illustrative of a customer premises gateway (e.g., 1208) including the bitrate forecasting module 1406. To the extent such a gateway is operative to manage scheduling of an outbound bandwidth pipe serving the customer premises, it may also include a suitable WFQ-based bandwidth pipe management module 1412. As will be appreciated by one skilled in the art, the functionality of bitrate forecasting may be provided as part of a persistent memory (e.g., non-volatile memory, which may comprise part of a generalized memory subsystem 1404), having appropriate program instructions or code portions that may be executed by one or more processors 1402. In one embodiment, the bitrate forecasting module 1406 may be configured to perform, under control of processors 1402: forecast bandwidth requirements, responsive to a request from a operator/subscriber policy management node, for one or more existing ABR clients of customer premises 602 with respect to corresponding ABR streaming sessions after accounting for a bandwidth requirement of a new ABR client's request for initiating a new streaming session on a client device; and generate a bandwidth forecast response message to the subscriber policy management node. As described above, the bandwidth forecast response message includes bitrates forecasted for the existing ABR streaming sessions and the requested new streaming session based at least in part upon priority weights associated with the existing ABR streaming sessions and the requested new streaming session. Appropriate transceiver (Tx/Rx) interfacing 1408 may be provided as part of component 1400 to facilitate bitrate forecast request/response messaging. Additional interfacing 1410 may also be provided depending on whether component 1400 is arranged as premises gateway 1208 or CDN node 1318.

Based upon the foregoing Detailed Description, it should be appreciated that one or more embodiments of the present disclosure can be advantageously implemented in a number of ABR applications, including legacy client applications as well as custom client applications. In addition to allowing the users to override standing policies, embodiments herein may facilitate control of how conflicts in policies are notified and resolved.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. For example, at least some of the nodes shown in the streaming network environment of FIG. 6 such as the operator/subscriber policy manager, back office, and conflict management, or example, may be integrated or otherwise co-located in different combinations. Finally, other blocks may be added/inserted between the blocks that are illustrated. Moreover, although some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method for managing conflict resolution in a customer premises disposed in an adaptive bitrate (ABR) streaming environment with respect to a subscriber bandwidth pipe serving a plurality of client devices of the customer premises of a subscriber, the method comprising:
   receiving, at a network element, a request from a new ABR client for an ABR streaming session to be served via the subscriber bandwidth pipe of the customer premises that includes one or more existing ABR clients executing on at least a subset of the client devices, wherein each existing ABR client is engaged in a corresponding ongoing ABR streaming session via the subscriber bandwidth pipe;
   determining, at the network element, a forecast of bandwidth requirements for the one or more existing ABR clients of the customer premises with respect to the corresponding ongoing ABR streaming sessions after accounting for a bandwidth requirement for the new ABR client's streaming session request, the determining based on modeling of bandwidth allocation of the subscriber bandwidth pipe serving the customer premises of the subscriber, using at least priority weights respectively associated with the one or more existing ABR streaming sessions via the subscriber bandwidth pipe and the requested ABR streaming session;
   responsive to the determining, detecting a conflict if a forecasted bandwidth requirement of at least one of the existing ABR clients of the customer premises violates a bitrate threshold policy relative to the corresponding ongoing ABR streaming session of the at least one of the existing ABR clients of the subscriber's customer premises; and
   if there is a conflict, providing a redirect message to the new ABR client for receiving a conflict notification that comprises a video-encoded still image of a message that the streaming session request from the new ABR client is being rejected on account of a bandwidth conflict in the customer premises, the message further indicating a total number of ongoing ABR streaming sessions in the customer premises.

2. The method as recited in claim 1, wherein the still image is encoded at a particular bitrate.

3. The method as recited in claim 2, wherein the particular bitrate for encoding the still image is computed using a Kush Gauge calculation.

4. The method as recited in claim 1, wherein the redirect message is provided to the new ABR client by way of a HyperText Transfer Protocol (HTTP) redirect message generated by an ABR back office that includes a manifest URL for the video-encoded still image.

5. The method as recited in claim 1, further comprising:
   determining that there is no conflict relative to the streaming session request from the new ABR client; and
   setting up a new streaming session responsive to the streaming session request from the new ABR client.

6. The method as recited in claim 1, wherein the determining of the forecast of bandwidth requirements with respect to the ongoing ABR streaming sessions is further based on display device information associated with the one or more existing ABR clients and the new ABR client.

7. The method as recited in claim 1, wherein the determining of the forecast of bandwidth requirements with respect to the ongoing ABR streaming sessions is performed at a premises gateway operating as the network element responsive to a forecasting request from a subscriber policy management node.

8. The method as recited in claim 1, wherein the determining of the forecast of bandwidth requirements with respect to the ongoing ABR streaming sessions is performed at a content delivery network (CDN) edge delivery node operating as the network element responsive to a forecasting request from a subscriber policy management node.

9. A system for managing conflict resolution in a customer premises disposed in an adaptive bitrate (ABR) streaming environment with respect to a subscriber bandwidth pipe serving a plurality of client devices of the customer premises of a subscriber, the system comprising:
   a back office operative to receive a request from a new ABR client for a new ABR streaming session to be served via the subscriber bandwidth pipe of the customer premises that includes one or more existing ABR clients executing on at least a subset of the client devices, wherein each existing ABR client is engaged in a corresponding ongoing ABR streaming session via the subscriber bandwidth pipe;
   a subscriber policy management node operative to request, responsive to a message from the back office, one of a premises gateway and a CDN edge delivery node for forecasted bandwidth requirements of the one or more existing ABR clients of the customer premises with respect to the corresponding ongoing ABR streaming sessions after accounting for a bandwidth requirement for the new ABR client's streaming session request, the subscriber policy management node further operative to detect a conflict if a forecasted bandwidth requirement of at least one of the existing ABR clients of the customer premises violates a bitrate threshold policy relative to the corresponding ongoing ABR streaming session of the at least one of the existing ABR clients, wherein a determination of a forecast of the bandwidth requirements is based on modeling of bandwidth allocation of the subscriber bandwidth pipe serving the customer premises of the subscriber, using at least priority weights respectively associated with the one or more existing ABR streaming sessions via the subscriber bandwidth pipe and the requested ABR streaming session; and
   a conflict management node operative, responsive to a conflict detection message from the subscriber policy management node, to provide a redirect message to the new ABR client for receiving a conflict notification that comprises a video-encoded still image of a message that the streaming session request from the new ABR client is being rejected on account of a bandwidth conflict in the customer premises, the message further indicating a total number of ongoing ABR streaming sessions in the customer premises.

10. The system as recited in claim 9, wherein the still image is video-encoded at a particular bitrate.

11. The system as recited in claim 10, wherein the particular bitrate for encoding the still image is computed using a Kush Gauge calculation.

12. The system as recited in claim 11, wherein the redirect message is provided to the new ABR client by way of a HyperText Transfer Protocol (HTTP) redirect message generated by the back office that includes a manifest URL for the video-encoded still image.

13. The system as recited in claim 9, wherein the determining of the forecast of bandwidth requirements with respect to the ongoing ABR streaming sessions is further based on display device information associated with the one or more existing ABR clients and the new ABR client.

14. A network element configured to facilitate conflict resolution in a customer premises with respect to a subscriber bandwidth pipe serving a plurality of client devices of the customer premises of a subscriber, the network element comprising:
one or more processors;
a bitrate forecasting module coupled to the one or more processors, wherein the bitrate forecasting module includes instructions executable by one or more processors and configured to:
determine a forecast of bandwidth requirements, responsive to a request from a subscriber policy management node, for one or more existing ABR clients of the customer premises with respect to corresponding ongoing ABR streaming sessions via the subscriber bandwidth pipe after accounting for a bandwidth requirement of a new ABR client's request for initiating a new streaming session on a client device via the subscriber bandwidth pipe, the determination based on modeling of bandwidth allocation of the subscriber bandwidth pipe serving the customer premises of the subscriber, using at least priority weights respectively associated with the one or more existing ABR streaming sessions via the subscriber bandwidth pipe and the requested new ABR streaming session; and
generate a bandwidth forecast response message to the subscriber policy management node with respect to the subscriber bandwidth pipe serving the customer premises, the bandwidth forecast response message including bitrates forecasted for the existing ABR streaming sessions and the requested new streaming session based on the modeling of bandwidth allocation of the subscriber bandwidth pipe, wherein the bandwidth forecast response message is operative to trigger a conflict detection mechanism to determine if a forecasted bandwidth requirement of at least one of the existing ABR clients of the customer premises violates a bitrate threshold policy relative to the corresponding ongoing ABR streaming session of the at least one of the existing ABR clients of the subscriber's customer premises; and
a conflict management module coupled to the conflict detection mechanism and operative, responsive to a conflict detection message, to provide a redirect message to the new ABR client for receiving a conflict notification that comprises a video-encoded still image of a message that the request from the new ABR client for initiating a new streaming session is being rejected on account of a bandwidth conflict in the customer premises, the message further indicating a total number of ongoing ABR streaming sessions in the customer premises.

15. The network element as recited in claim 14, wherein the determining of the forecast of bandwidth requirements with respect to the ongoing ABR streaming sessions is further based on display device information associated with the one or more existing ABR clients and the new ABR client.

16. The network element as recited in claim 14, further comprising a bandwidth allocation and pipe management module for modeling bandwidth allocation of the bandwidth pipe serving the customer premises using weighed fair queuing (WFQ) with respect to the ABR streaming sessions.

* * * * *